US012774025B2

(12) United States Patent
Zhong

(10) Patent No.: US 12,774,025 B2
(45) Date of Patent: Oct. 27, 2026

(54) LOCKING MECHANISM AND CHILD STROLLER INCLUDING THE SAME

(71) Applicant: WONDERLAND SWITZERLAND AG, Steinhausen (CH)

(72) Inventor: Zhiren Zhong, Dongguan (CN)

(73) Assignee: Wonderland Switzerland AG, Steinhausen (CH)

( * ) Notice: Subject to any disclaimer, the term of this patent is extended or adjusted under 35 U.S.C. 154(b) by 306 days.

(21) Appl. No.: 18/717,659

(22) PCT Filed: Dec. 9, 2022

(86) PCT No.: PCT/EP2022/085236
§ 371 (c)(1),
(2) Date: Jun. 7, 2024

(87) PCT Pub. No.: WO2023/105066
PCT Pub. Date: Jun. 15, 2023

(65) Prior Publication Data

US 2024/0409147 A1 Dec. 12, 2024

(30) Foreign Application Priority Data

Dec. 9, 2021 (CN) ......................... 202111499757.6

(51) Int. Cl.
*B62B 7/14* (2006.01)

(52) U.S. Cl.
CPC ..................................... *B62B 7/14* (2013.01)

(58) Field of Classification Search
CPC ........... B62B 7/14; B62B 7/062; B62B 7/142; B62B 7/147; B62B 7/00; B62B 7/06; B62B 2205/20; B62B 9/12
See application file for complete search history.

(56) References Cited

U.S. PATENT DOCUMENTS 7,681,894 B2 * 3/2010 Santamaria ............. B62B 7/142
280/47.38
8,322,744 B2 * 12/2012 Ahnert .................... B62B 7/142
280/47.4

(Continued)

FOREIGN PATENT DOCUMENTS

| | | |
|---|---|---|
| CN | 101954922 A | 1/2011 |
| CN | 206012692 U | 3/2017 |

(Continued)

OTHER PUBLICATIONS

International Search Report and Written Opinion for PCT Patent Application No. PCT/EP2022/085236, Mailed Date: Mar. 28, 2023, 8 pages.

(Continued)

*Primary Examiner* — James M Dolak
(74) *Attorney, Agent, or Firm* — Volpe Koenig

(57) ABSTRACT

According to the application, a locking mechanism for connecting a first object and a second object rotatable to each other to a third object is disclosed. The locking mechanism is connected to the first object and the second object, and is releasably connected to the third object; wherein a rotation of the second object in respect to the first object allows the locking mechanism to be released from the third object. A child stroller is also disclosed.

16 Claims, 26 Drawing Sheets

(56) References Cited

U.S. PATENT DOCUMENTS

| | | | | |
|---|---|---|---|---|
| 8,474,854 | B2 * | 7/2013 | Dean | B62B 7/142 280/47.38 |
| 8,491,000 | B2 * | 7/2013 | Yeh | B62B 7/142 280/647 |
| 8,672,341 | B2 * | 3/2014 | Offord | B62B 7/08 280/47.38 |
| 8,764,048 | B1 * | 7/2014 | Ahnert | B62B 9/104 280/658 |
| 8,894,090 | B1 * | 11/2014 | Chen | B62B 7/062 280/47.38 |
| 10,836,419 | B2 * | 11/2020 | Oakes | B62B 7/08 |
| 11,091,186 | B2 * | 8/2021 | Zhang | B62B 7/062 |
| 11,247,710 | B2 * | 2/2022 | Yi | B62B 7/142 |
| 11,807,289 | B2 * | 11/2023 | Zhong | B62B 7/142 |
| 11,851,100 | B2 * | 12/2023 | Zhong | B62B 7/06 |
| 11,897,535 | B2 * | 2/2024 | Zhang | B62B 7/064 |
| 2007/0187914 | A1 | 8/2007 | Jane Santamaria | |
| 2011/0012324 | A1 | 1/2011 | Yeh et al. | |
| 2019/0320812 | A1 | 10/2019 | Zhong | |
| 2019/0322304 | A1 | 10/2019 | Zhong | |
| 2020/0239058 | A1 | 7/2020 | Zhang | |
| 2021/0339784 | A1 | 11/2021 | Zhang | |

FOREIGN PATENT DOCUMENTS

| | | | |
|---|---|---|---|
| CN | 206367506 | U | 8/2017 |
| CN | 207089397 | U | 3/2018 |
| CN | 108454687 | A | 8/2018 |
| CN | 207697798 | U | 8/2018 |
| CN | 209852402 | U | 12/2019 |
| CN | 112109793 | A | 12/2020 |
| CN | 214776130 | U | 11/2021 |
| CN | 215043054 | U | 12/2021 |
| EP | 2275321 | A2 | 1/2011 |
| JP | 2012-505101 | A | 3/2012 |
| JP | 2018-505815 | A | 3/2018 |
| TW | 202106549 | A | 2/2021 |
| TW | 202110685 | A | 3/2021 |

OTHER PUBLICATIONS

Office Action Issued in Corresponding Taiwanese Patent Application No. 111147405, Mailed Date: Jun. 30, 2023, 6 pages.

Office Action Issued in Corresponding Chinese Patent Application No. 202111499757.6, Mailed Date: May 16, 2024, 12 pages.

“First Office Action Issued in Corresponding Taiwanese Patent Application No. 113108961”, Mailed Date: Nov. 21, 2024, 4 pages.

“Search Report Issued in Corresponding Japanese Patent Application No. 2024-534377”, Mailed Date: May 1, 2025, 24 pages.

“First Office Action Issued in Corresponding Japanese Patent Application No. 2024-534377”, Mailed Date: Jun. 3, 2025, 6 pages.

* cited by examiner

LOCKING MECHANISM AND CHILD STROLLER INCLUDING THE SAME

CROSS-REFERENCE TO RELATED APPLICATIONS

This application is a U.S. National Phase of International Application No. PCT/EP2022/085236, filed on Dec. 9, 2022, which claims priority to Chinese Patent Application No. 202111499757.6, filed on Dec. 9, 2021, titled "LOCKING MECHANISM AND CHILD STROLLER INCLUDING THE SAME", the entirety of which are incorporated by reference herein.

TECHNICAL FIELD

The present application relates to a locking mechanism and a child stroller including the locking mechanism.

BACKGROUND

A child stroller is a common infant product, which usually has a frame, wheels and a seat. Among them, the frame is a part used to carry and connect other parts, the wheels are located under the frame to provide a walking function for the child stroller, and the seat is mounted on the frame provide a sitting function for children. The frame includes handrails, which are located above the frame, so as to facilitate the caregiver to push the child stroller.

In an existing child stroller, the seat can be detachably mounted on the frame by a locking mechanism, and the car seat can be reversely installed, that is, it can be mounted on the frame in a forward or reverse direction, such that the child can turn his back to the caregiver or face the caregiver.

SUMMARY

According to the application, a locking mechanism for connecting a first object and a second object rotatable to each other to a third object is disclosed. The locking mechanism is connected to the first object and the second object, and is releasably connected to the third object; wherein a rotation of the second object in respect to the first object allows the locking mechanism to be released from the third object.

In an embodiment, the locking mechanism includes: a first casing fixed to the first object and having a first rotational disk; a second casing fixed to the second object and having a second rotational disk, the first rotational disk and the second rotational disk are stacked along a transversely extending rotating axis and rotatable in respect to each other; a fixed base fixed to the third object; a socket fixed to the first casing, extending outward from an outer periphery of the first rotational disk and being releasably inserted into the fixed base; a locking member at least partially accommodated in the socket, capable of moving between a locked position where the locking member is protruding from the socket and engaged with the third object and a released position where the locking member is retracted into the socket and disengaged from the third object; wherein a convex portion is disposed on an outer periphery of the second rotational disk, and when the second rotational disk rotates from a first angular position to a second angular position in respect to the first rotational disk, the convex portion is capable of acting on the locking member to drive the locking member from the locked position to the released position.

In an embodiment, the locking mechanism further includes: a slider slidably disposed on the socket and capable of sliding between a proximal position close to the second casing and a distal position away from the second casing; when the second rotational disk rotates from the first angular position to the second angular position, the convex portion abuts against the slider and drives the slider from the proximal position to the distal position; and the slider is joined to the locking member, and drives the locking member from the locked position to the released position when moving from the proximal position to the distal position.

In an embodiment, the slider has two side walls and an accommodating space formed between the two side walls, at least one of the side walls is provided with a slot extending obliquely with respect to both vertical and horizontal directions, the locking member is inserted into the accommodation space, and a pin protruding from one side of the locking member is slidably inserted into the slot, such that a vertical movement of the slider from the proximal position to the distal position is converted into a transversal movement of the locking member from the locked position to the released position.

In an embodiment, the locking mechanism further includes: an engaging member and a driving member, stacked in an accommodation space formed between the first casing and the second casing along the rotating axis, the engaging member is inserted into the first casing in a matched shape, and the driving member is accommodated in the second casing and abuts against or is connected to the engaging member; wherein the driving member is driven to rotate about the rotating axis, and rotation of the driving member brings the engaging member to move transversely, such that the engaging member partially moves out of the first casing and is inserted into the second casing, or is separated from the second casing and moved into the first casing, when the engaging member is inserted into the second casing, the engaging member locks the second casing and the first casing to prevent them from rotating in respect to each other, meanwhile the second rotational disk is in the first angular position, and when the engaging member is separated from the second casing, the second casing is rotatable in respect to the first casing.

In an embodiment, the driving member is a disk-shaped component, at least two driving member inclined surfaces facing the second casing are uniformly distributed on a periphery of the driving member along a circumferential direction, and a corresponding second casing inclined surface facing the at least two driving member inclined surfaces is formed on an inner side of the second casing, and when the driving member is driven to rotate, the driving member inclined surfaces interact with the second casing inclined surface to convert a rotational motion of the driving member in respect to the second casing into a lateral movement of the engaging member towards the first casing, such that the engaging member is separated from the second casing.

In an embodiment, the engaging member is substantially disk-shaped, and has two engaging portions projecting outwardly at two radial ends distributed along its circumferential direction, and an inner side of the second casing is provided with an engaging groove having a shape corresponding to that of the engaging member; and the locking mechanism further includes a first elastic member, and the first elastic member is disposed between the first casing and the engaging member to bias the engaging member into the second casing.

In an embodiment, the locking mechanism further includes a second elastic member, and the second elastic member is disposed between the slider and the socket to bias the slider toward the proximal position; the locking member has a locking tab capable of protruding from the socket to be inserted into the third object, and a locking member inclined surface is disposed on an outer surface of the locking tab in a direction of inserting into the fixed base along the socket, such that during a process that the locking mechanism is inserted into the fixed base, the fixed base is capable of temporarily retracting the locking member into the socket by the locking member inclined surface.

In an embodiment, the locking mechanism further includes a drag member, the drag member has a drag second end connected to the driving member and a drag first end extending out of the locking mechanism, when the drag first end is dragged, the drag member is capable of brining the driving member to rotate.

In an embodiment, the locking mechanism further includes an operating device, the operating device is mounted on the second object and includes: a slidable connecting member transversal slidably mounted on the second object along a transversal direction; and an operating member slidably or rotatably mounted on the second object and operatively coupled with the slidable connecting member; wherein the drag first end of the drag member is connected to a pair of the slidable connecting members, and an operation of the operating member is capable of brining the slidable connecting members to slide toward each other, thereby dragging the drag member.

In an embodiment, at least one driving rib with a driving slope is arranged on the operating member, and each one of the slidable connecting members is provided with a driving groove portion engaged with the at least one driving rib, the at least one driving rib acts on the driving groove portion by the driving slope to bring the slidable connecting members to slide.

In an embodiment, an angle difference between the first angular position and the second angular position is between 120 degrees and 180 degrees; the driving member inclined surface and the second casing inclined surface are arc inclined surfaces capable of being engaged with each other.

According to the application, a child stroller includes: a frame; at least one wheel, mounted under the frame; and a seat, detachably mounted on the frame by the locking mechanism according to the application, wherein the first object is a lower supporting tube of the seat, the second object is an upper supporting tube of the seat, and the third object is the frame; wherein the lower supporting tube and the upper supporting tube are respectively U-shaped, and both ends of two legs of the U-shaped lower supporting tube and both ends of two legs of the U-shaped upper supporting tube are correspondingly connected to each other by the locking mechanism.

BRIEF DESCRIPTION OF THE DRAWINGS

Embodiments of the application will be described in detail below with reference to the accompanying drawings, in which.

DETAILED DESCRIPTION

Although the invention is illustrated and described herein with reference to specific embodiments, the invention should not be limited to the details shown. Exactly, within the scope of the equivalent solutions of the appended claims and without departing from the invention, varieties of modifications can be made to these details.

The directional descriptions related herewith, such as "front," "back," "up," and "down" and the like, are only for convenience of understanding, and the invention is not limited to these directions, but can be adjusted according to the actual situation. Moreover, although this application has been listed and described with reference to typical embodiments, the terms used are illustrative and exemplary, rather than restrictive. In addition, in the application, the singular forms "a," "an," and "the" include plural references unless the context clearly dictates otherwise.

A frame and a seat of the child stroller according to the application will be generally described with reference to FIGS. 1 to 5.

As shown, a frame 400 generally extends in an up-and-down direction with an upper end inclined backwardly. The frame 400 has two vertical portions arranged side by side, and a transverse portion connecting the two vertical portions horizontally above. Wheels (not shown) are mounted under the vertical portions, and the transverse portion also serves as a handrail portion for a user to push the child stroller.

Figure 1:
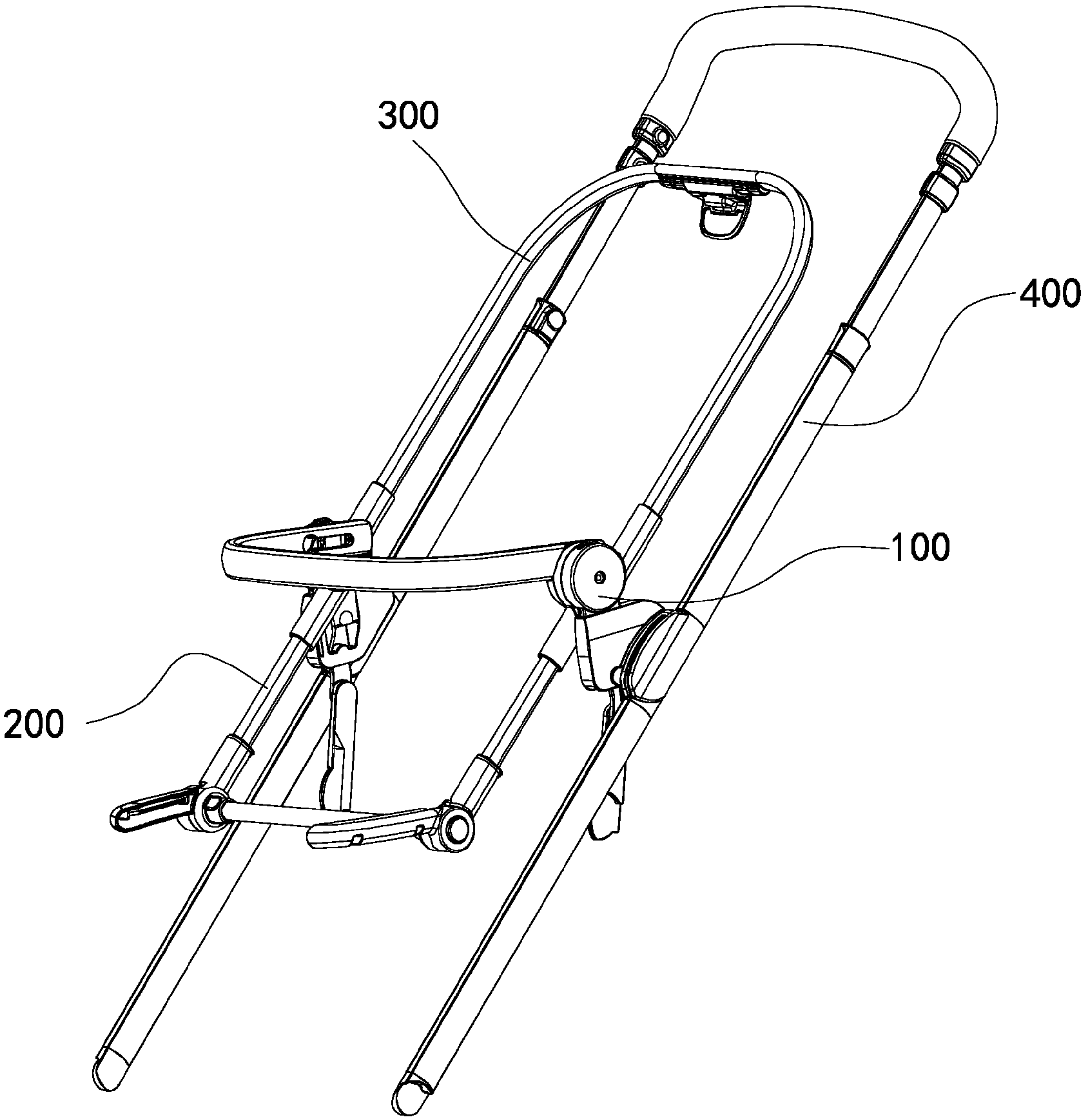
FIG. 1 is a perspective view of a frame and a seat of a child stroller according to the application, only part of the frame is shown and the fabric part is not shown for sake of convenience.
Figure 2:
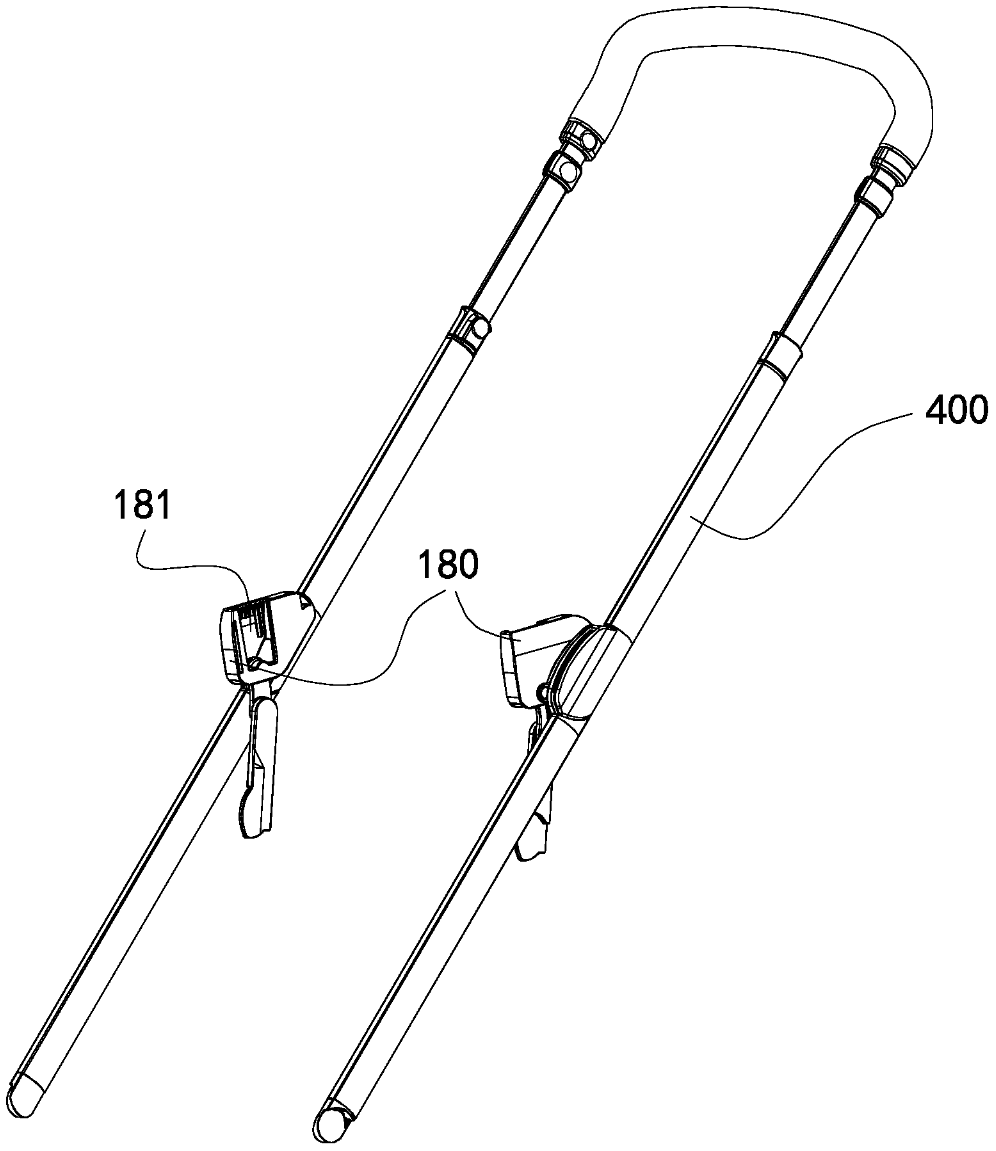
FIG. 2 is a perspective view of a part of the frame shown in FIG. 1.

Referring to FIGS. 1 to 2, the two vertical portions of the frame 400 are respectively fixedly mounted with fixed bases 180, and socket grooves 181 are formed on the fixed bases 180. The socket grooves 181 are generally opened upwardly, such that sockets 130 (see FIG. 3) of locking mechanism 100 can be inserted into the socket grooves 181.

The seat is detachably mounted on the frame 400 by the locking mechanism 100. The seat includes an upper supporting tube 300, a lower supporting tube 200, and a backrest (not shown) mounted on the upper supporting tube 300 and a chair (not shown) mounted on the lower supporting tube 200. The lower supporting tube 200 and the upper supporting tube 300 are respectively U-shaped, and both ends of two legs of the U-shaped lower supporting tube 200 and both ends of two legs of the U-shaped upper supporting tube 300 are correspondingly connected to each other by the locking mechanism 100.

Figure 3:
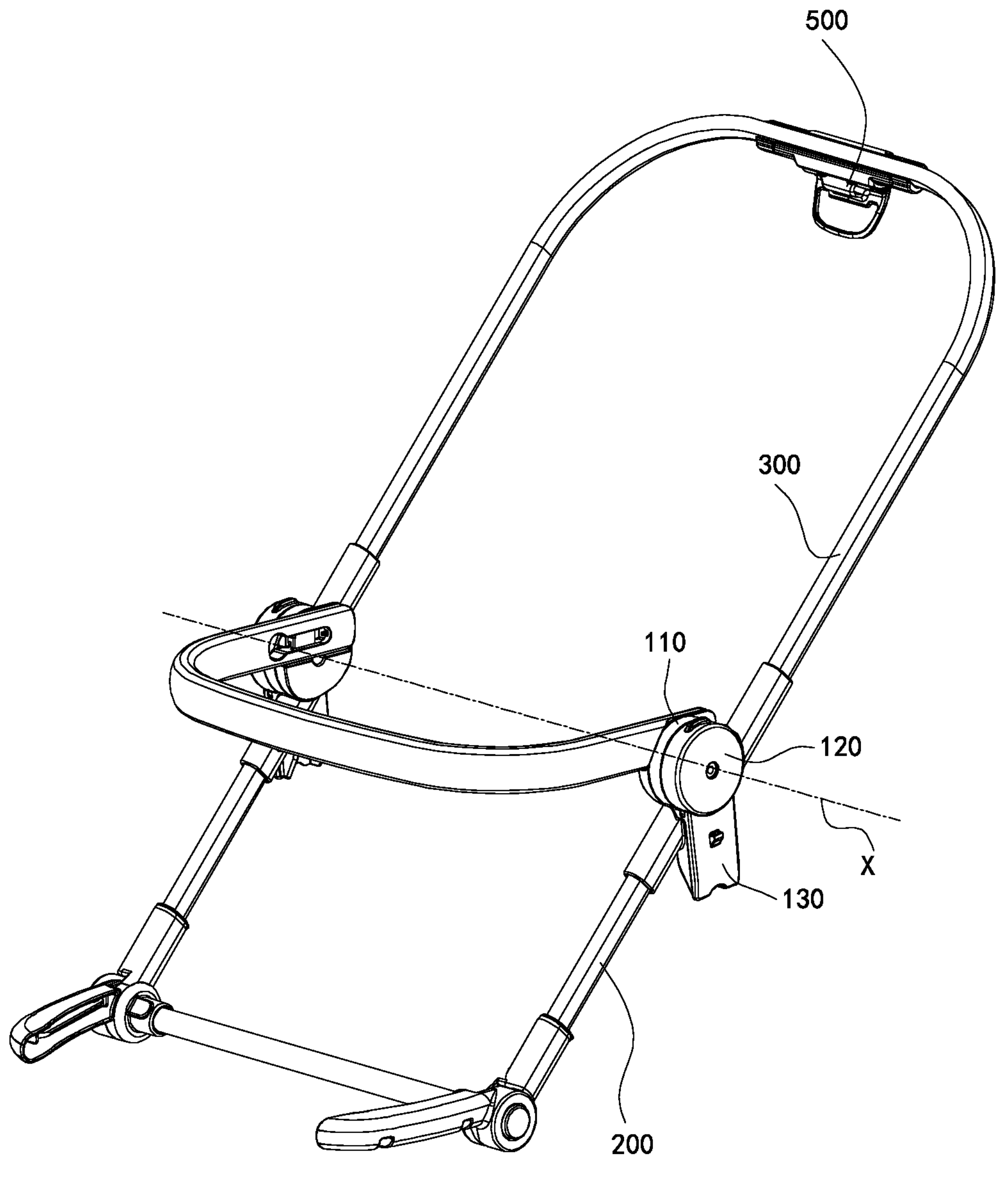
FIGS. 3 and 4 are perspective views of the seat of the child stroller according to the application in two different angles, wherein an upper supporting tube is in an unfolded state.
Figure 4:
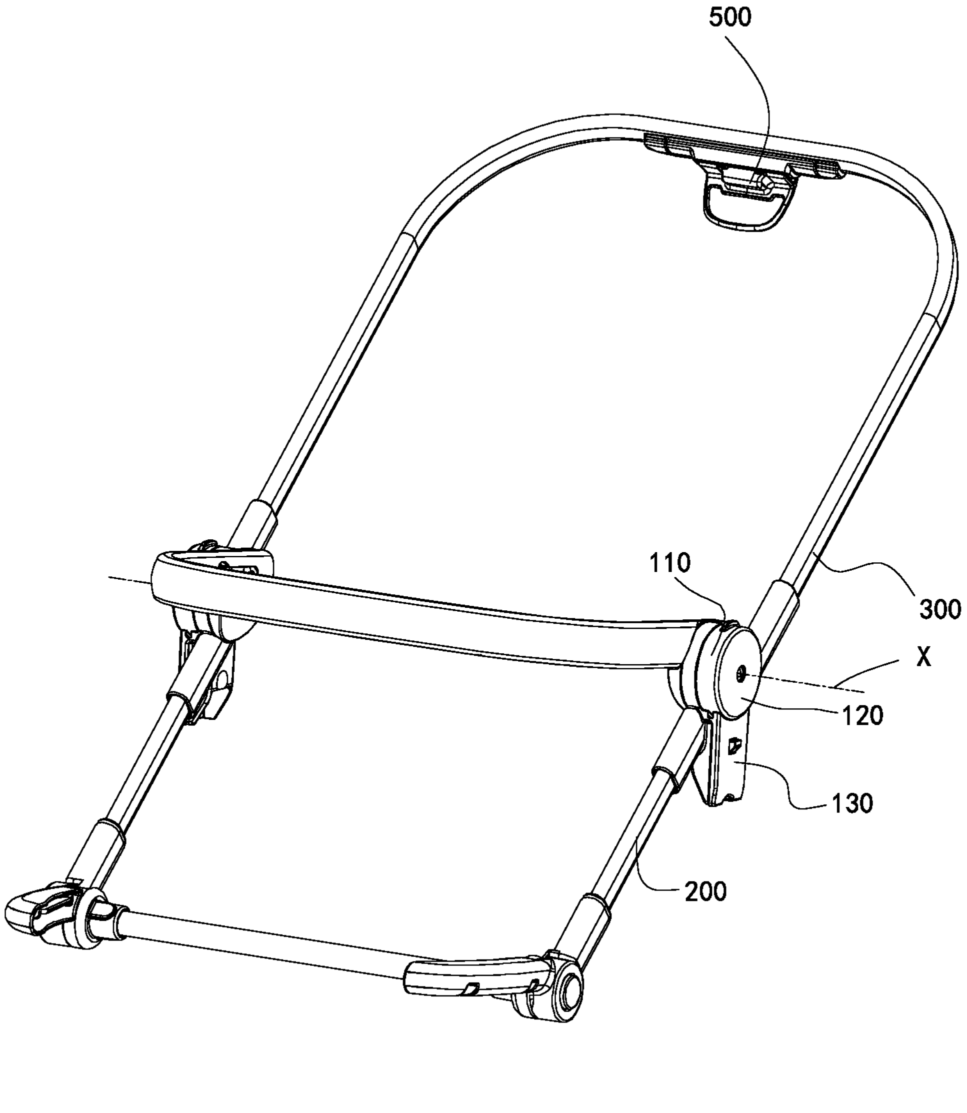
Figure 5:
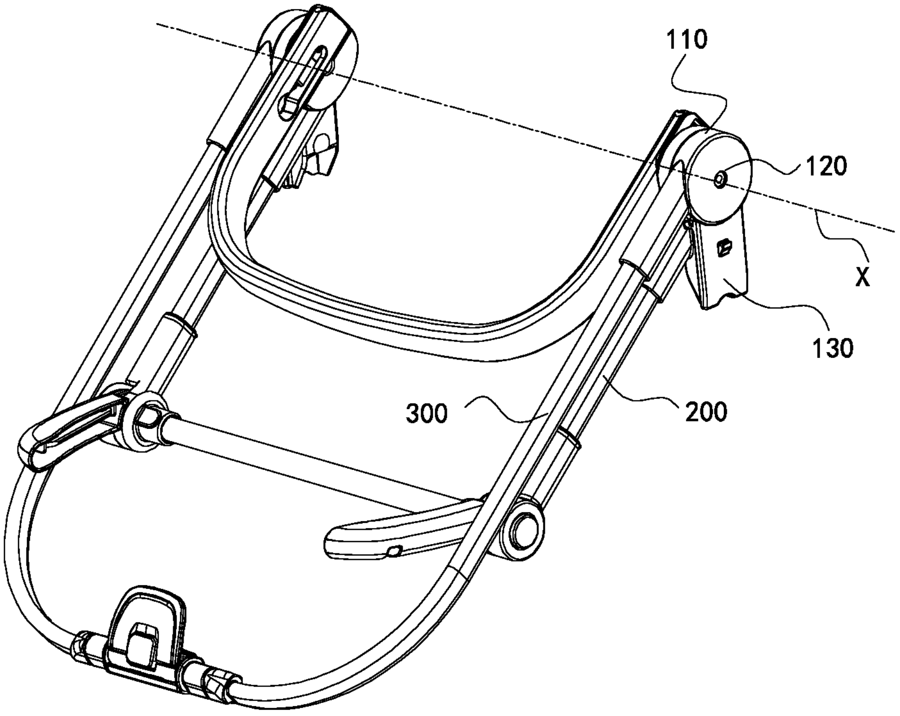
FIG. 5 is a perspective view of the seat, in which the upper supporting tube is in a folded state.
Figure 6A:
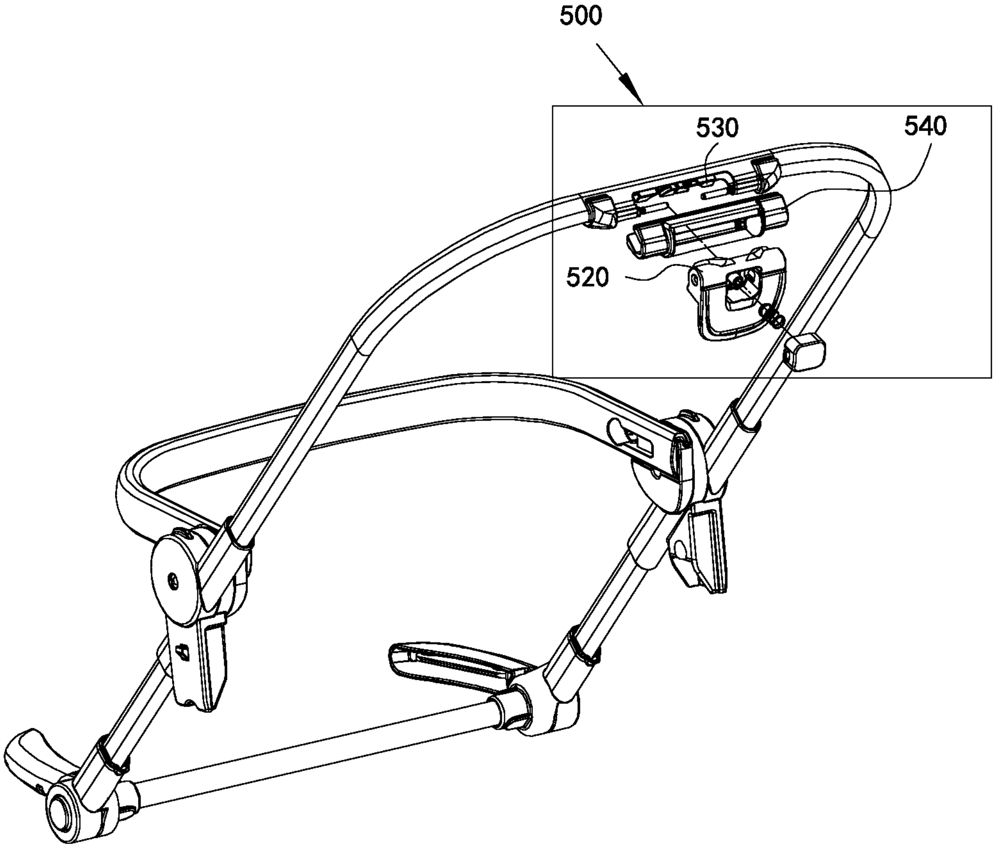
FIG. 6A is a perspective view of the seat, in which an operating member on a handrail is shown in an exploded state.
Figure 6B:
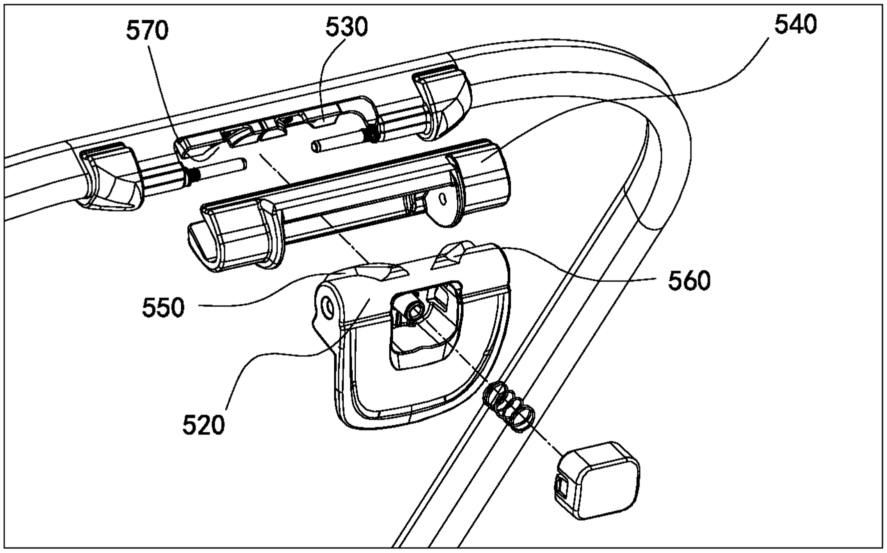
FIG. 6B is a partially enlarged view of the block part in FIG. 6A.
Figure 7A:
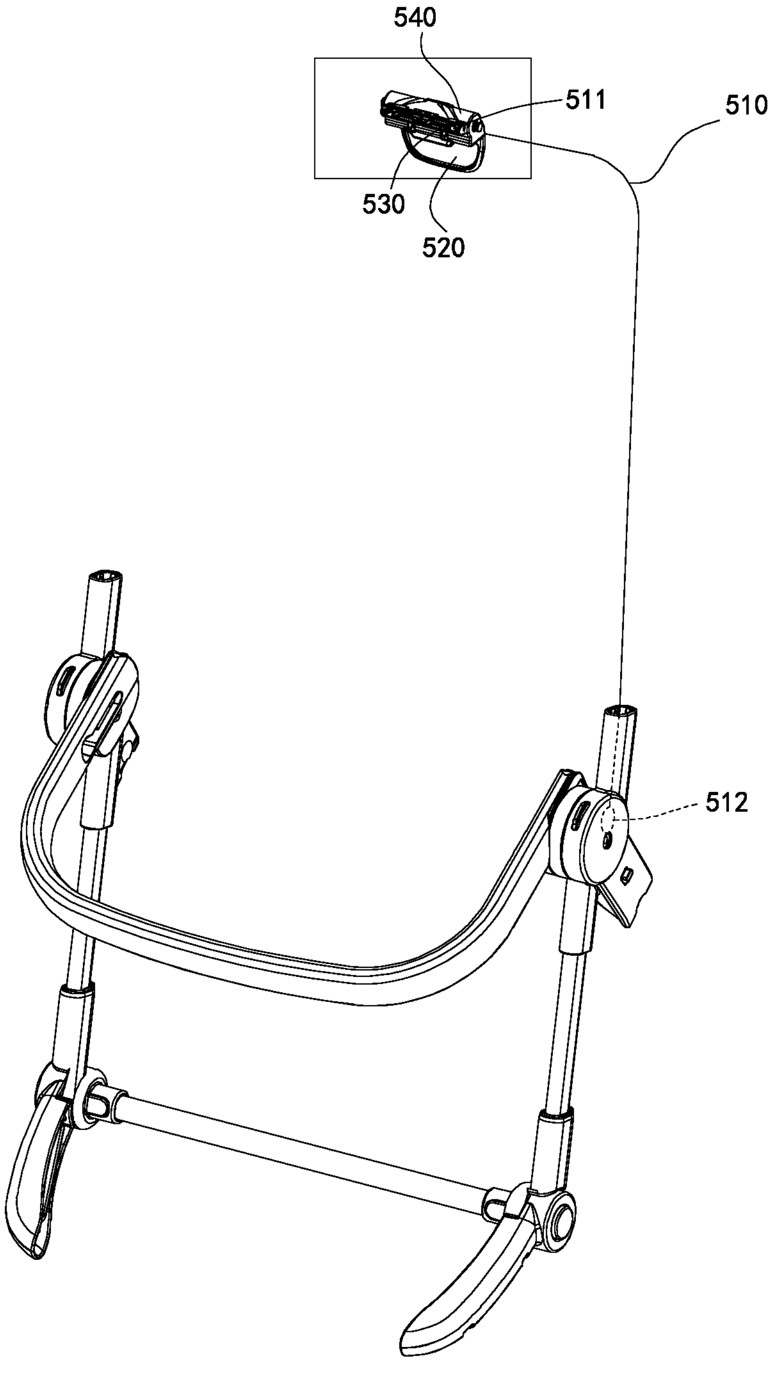
FIG. 7A is a perspective view of the seat, in which the upper supporting tube and the handrail are removed to show that the operating member is connected to the locking mechanism by a drag member.
Figure 7B:
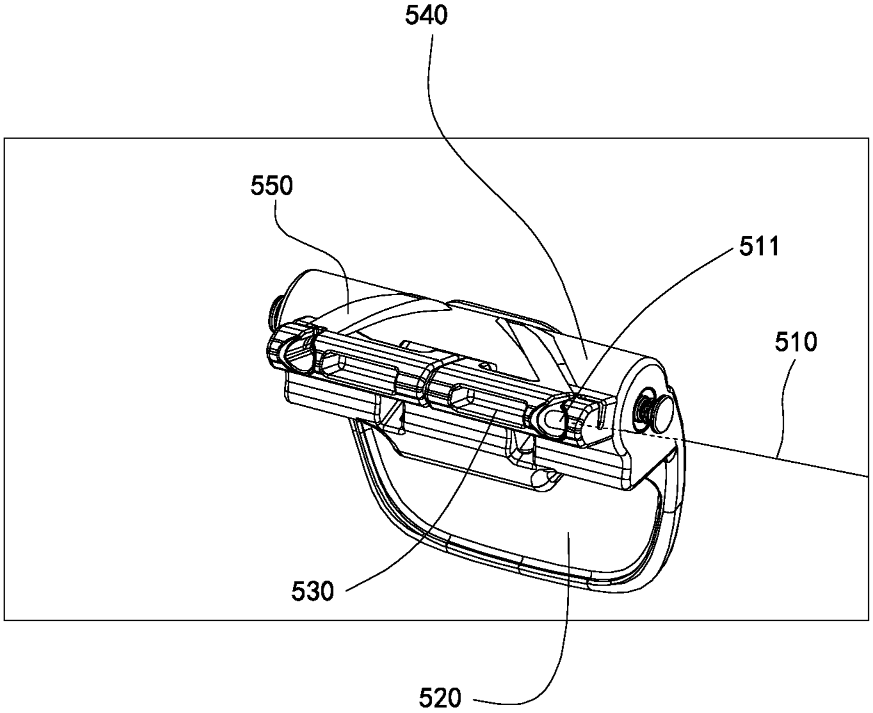
FIG. 7B is a partially enlarged view of the block part in FIG. 7A.

In the unfolded state of the child stroller shown in FIGS. 3 to 4, the upper supporting tube 300 extends obliquely upward from the locking mechanism 100, and the lower supporting tube 200 extends obliquely downward from the locking mechanism 100, and extension directions of the two supporting tubes form an included angle of approximately 180 degrees. In the folded state of the child stroller shown in FIG. 5, the upper supporting tube 300 is rotated downward by the locking mechanism 100 to substantially overlap with the lower supporting tube 200.

The locking mechanism 100 of the application generally includes a first casing 110, a second casing 120, a fixed base 180, a socket 130, an operating device 500, and a drag member 510. Among them, the first casing 110 is fixed to the lower supporting tube 200 of the seat, the second casing 120 is fixed to the upper supporting tube 300 of the seat, the fixed base 180 is fixed to the frame 400, and the socket 130 is fixed to the first casing 110. The second casing 120 is rotatable about a transversal axis X in respect to the first casing 110, such that the upper supporting tube 300 rotates in respect to the lower supporting tube 200. The operating device 500 according to the application is disposed on the transverse portion of the upper supporting tube 300, and the user can unlock the rotation of the second casing 120 through the operating device 500. The socket 130 can be separated from the fixed base 180 only when the upper supporting tube 300 is rotated to a position substantially overlapping with the lower supporting tube 200. In this way, the user must fold the seat at first, then the seat can be taken off from the frame 400, which can avoid the dangerous operation that the user takes off the child together with the seat from the frame 400.

The operating device 500 according to the application will be described in detail with reference to FIGS. 6A to 7B.

Figure 8A:
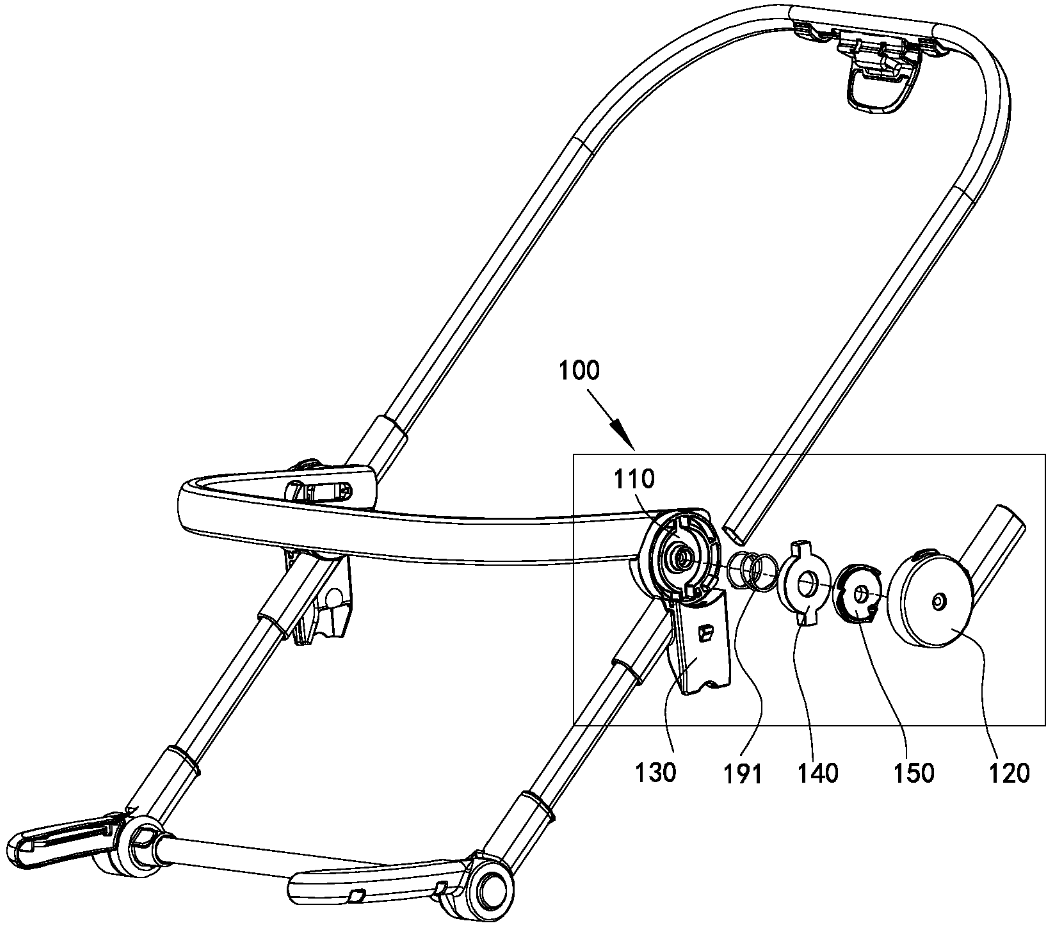
FIG. 8A is a perspective view of the seat, in which the locking mechanism is shown in an exploded view.

As shown, the operating device 500 is mounted on the transverse portion of the upper supporting tube 300, and includes a slidable connecting member 530 (see FIG. 7A) and an operating member 520 (see FIG. 8A).

The slidable connecting member 530 is slidably mounted on the upper supporting tube 300 along a transversal direction. More specifically, the slidable connecting member 530 is arranged in a hollow interior of the transverse portion of the upper supporting tube 300, and is slidable along the transverse portion. The operating member 520 is slidably or rotatably mounted on the upper supporting tube 300, and is operatively coupled with the slidable connecting member 530. Both ends of the drag member 510 are respectively connected to the slidable connecting member 530 shown in FIG. 7A and a driving member 150 shown in FIG. 8A. More specifically, the drag member 510 has a drag second end 512 connected to the driving member 150, and a drag first end 511 extending out of the locking mechanism 100 and connected to the slidable connecting member 530. When the drag member 510 is dragged, it will bring the driving member 150 to unlock the second casing 120 to rotate.

In this embodiment, the operating member 520 is arranged to be rotatably mounted in a mount base 540, so as to rotate along the transversal axis. A driving rib 550 is arranged on an outer periphery of the operating member 520, and the driving rib 550 has an obliquely extending driving slope 560. The slidable connecting member 530 is provided with a driving groove portion 570 engaged with the driving rib 550. The driving rib 550 acts on the driving groove portion 570 to bring the slidable connecting member 530 to slide by the driving slope 560. The drag first end 511 of the drag member 510 is connected to a pair of slidable connecting members 530, and an operation of the operating member 520 can bring the slidable connecting members 530 to slide toward each other, thereby dragging the drag members 510. In this way, when the user rotates the operating member 520, the drag members 510 will be dragged to move toward the middle, that is, toward the direction away from the first casing 110 and the second casing 120.

In other embodiments, the operating member 520 may also be arranged to move linearly, such as being pulled outward or pushed inward in respect to the transverse portion of the upper supporting tube 300, so as to drive a lateral movement of the slidable connecting member 530.

The specific structure of the locking mechanism 100 will be described with reference to FIGS. 8A to 12B.

Figure 14A:
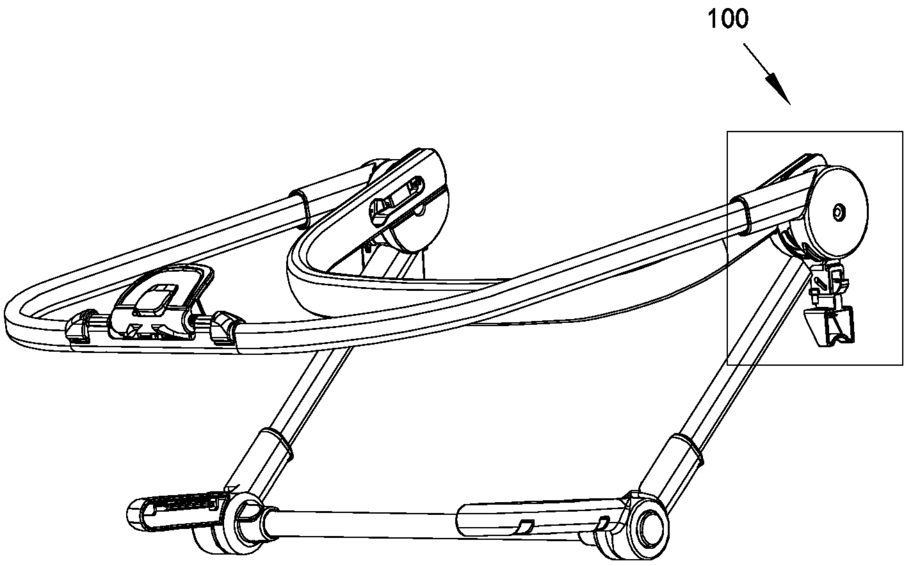
FIG. 14A is a perspective view of the seat, in which the upper supporting tube is in a partially folded state, and the outer surface of the socket is removed to show the slider and the locking member.
Figure 14B:
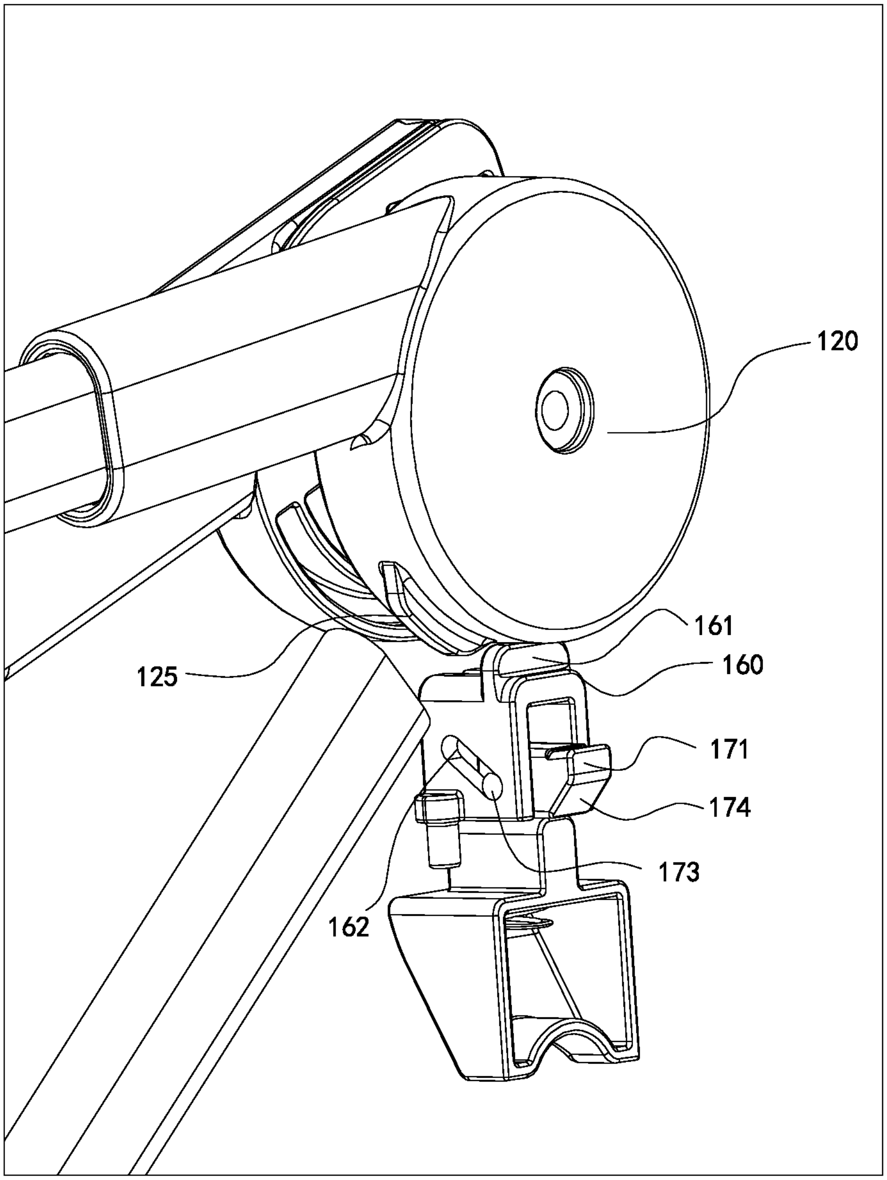
FIG. 14B is a partially enlarged view of the block part in FIG. 14A.
Figure 15A:
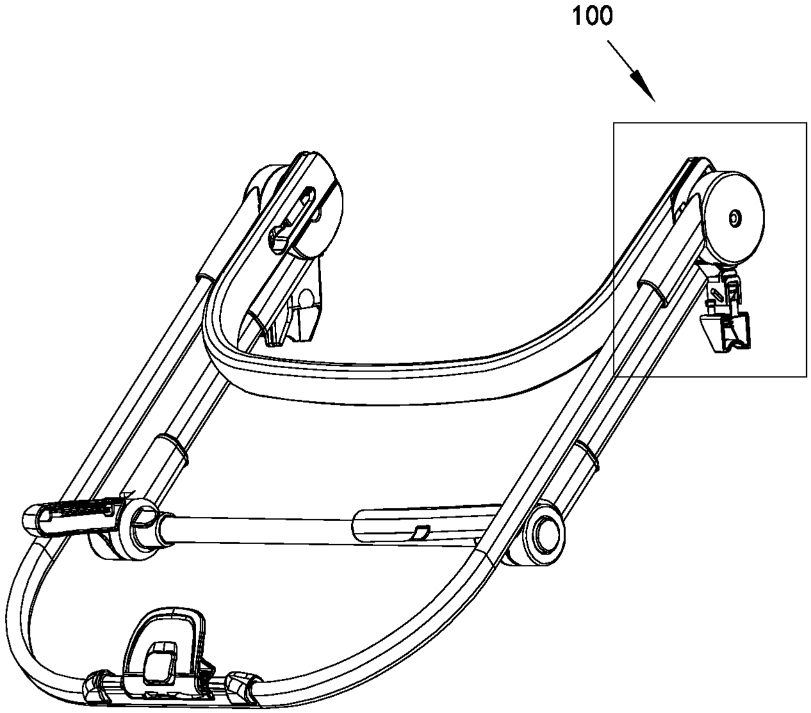
FIG. 15A is a perspective view of the seat, in which the supporting tube is in a folded state, and the outer surface of the socket is removed to show the slider and the locking member.
Figure 15B:
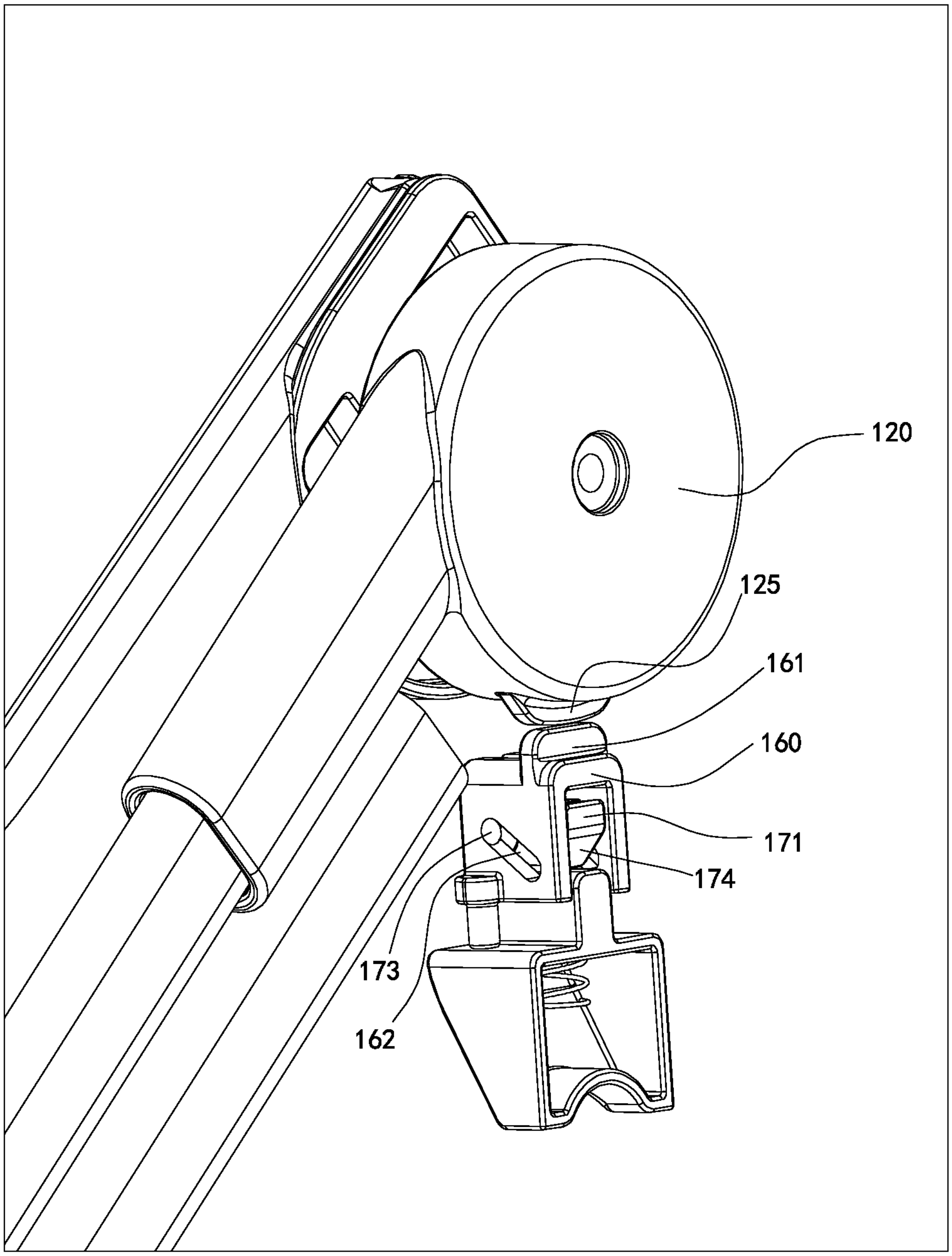
FIG. 15B is a partially enlarged view of the block part in FIG. 15A.

As shown, in addition to the first casing 110, the second casing 120, the fixed bases 180, the sockets 130, and the driving member 150 which have been described above, the locking mechanism 100 further includes a locking member 170, a slider 160 (FIG. 14B), an engaging member 140, and a first elastic member 191 and a second elastic member 192.

Figure 8B:
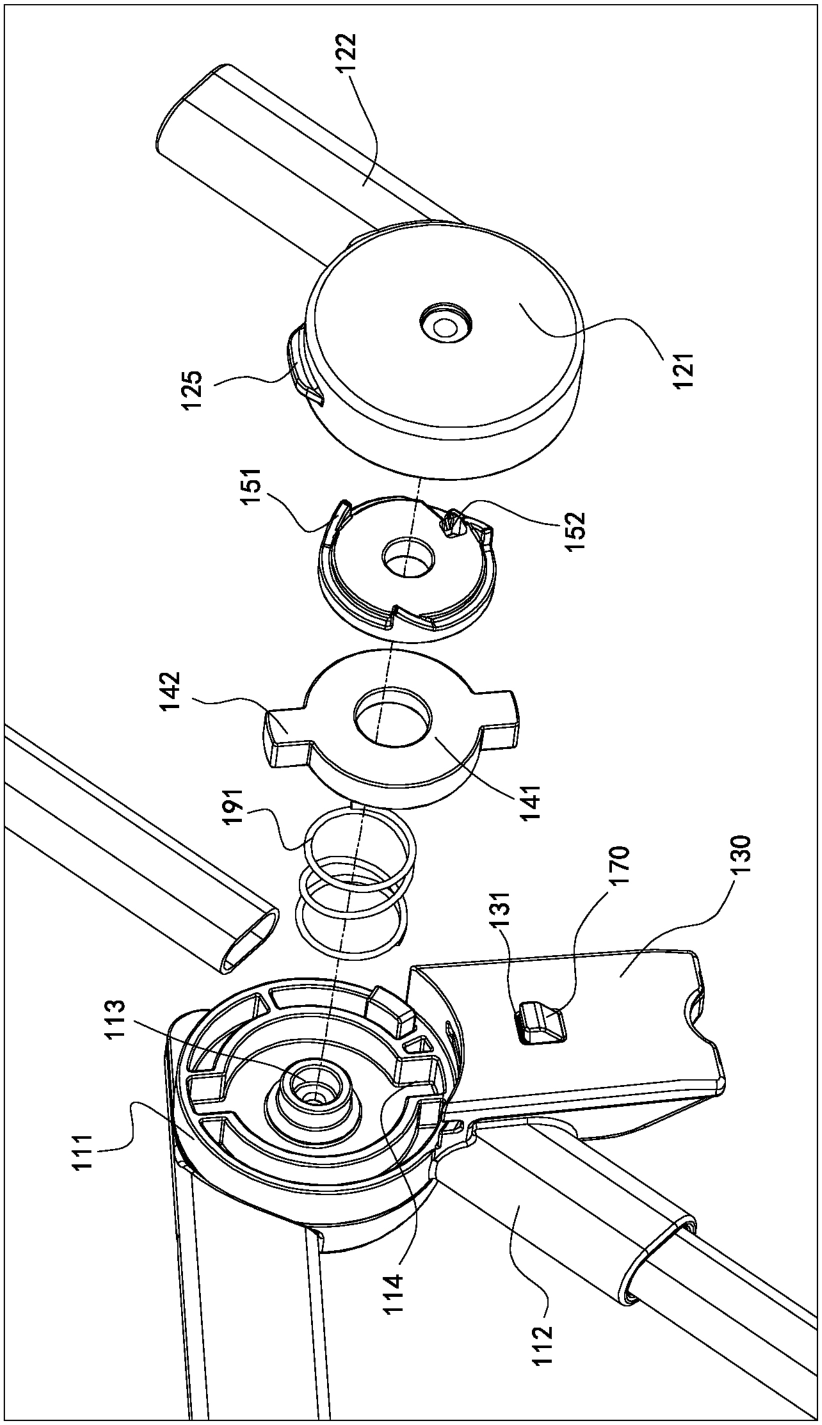
FIG. 8B is a partially enlarged view of the block part in FIG. 8A.
Figure 9A:
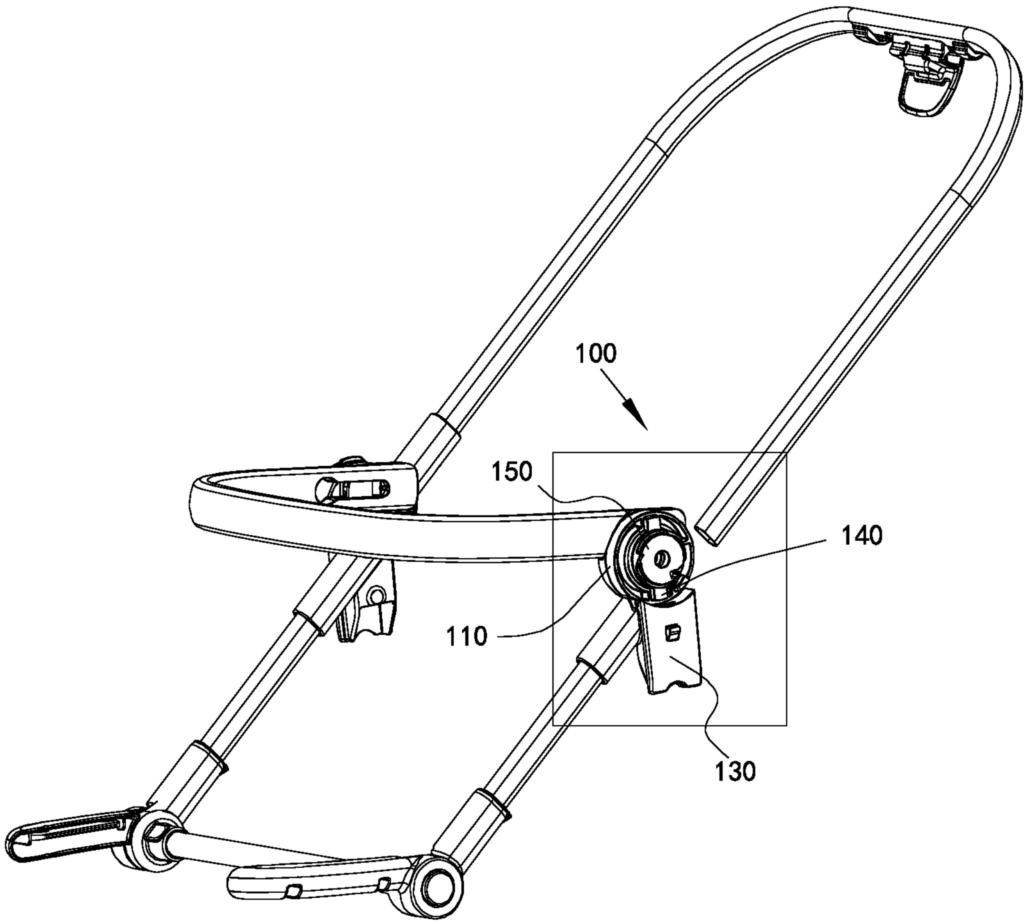
FIG. 9A is a perspective view of the seat in the unfolded state, in which an outer casing of the locking mechanism is removed to show an internal structure.
Figure 9B:
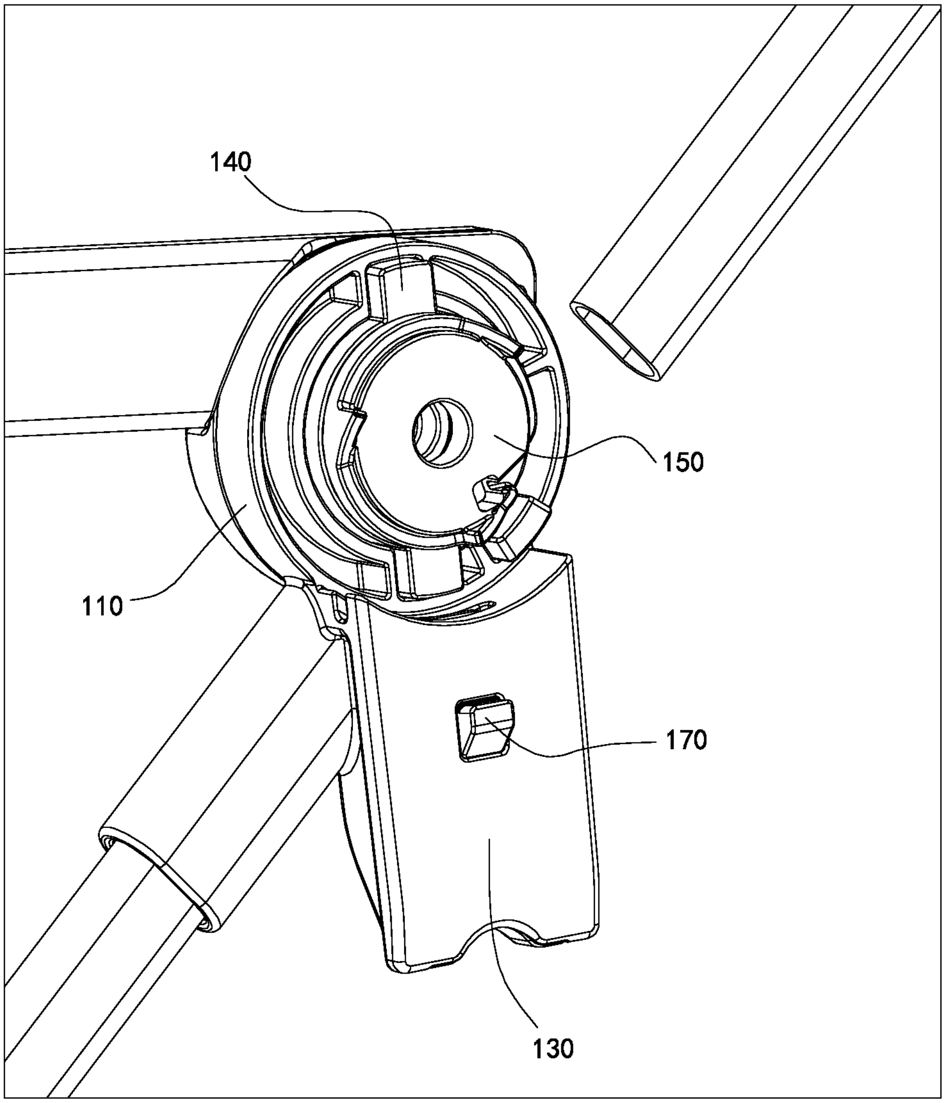
FIG. 9B is a partially enlarged view of the block part in FIG. 9A.

Referring to FIG. 8B, the first casing 110 (see FIG. 1) has: a first rotational disk 111 (FIG. 1), a first connecting portion 112, a first hole 113, and an accommodation groove 114. Among them, the first rotational disk 111 is a disk-shaped portion for being joined to the second casing 120. The first connecting portion 112 extends obliquely downward from an outer periphery of the first rotational disk 111 for being joined to the lower supporting tube 200, and the first rotational disk 111 may be arranged corresponding to the lower supporting tube 200, for example, the first rotational disk 111 may be arranged as a sleeve or an insert. The first hole 113 is formed in a center of the first rotational disk 111 for a transversal rotating shaft to be inserted therein. The accommodation groove 114 is formed on an inner surface of the first rotational disk 111, and extends from the inner surface toward the second rotational disk 121 (i.e., in the transverse direction of the child stroller). The accommodation groove 114 has a shape corresponding to that of the engaging member 140 and is used for accommodating the engaging member 140.

Figure 10:
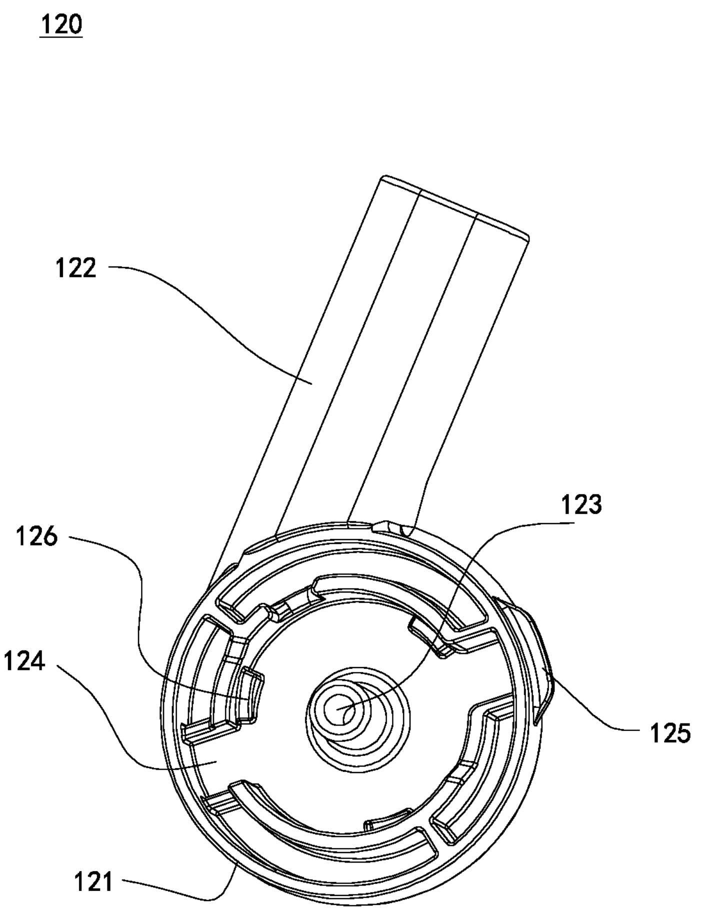
FIG. 10 is a perspective view of the outer casing viewed from the inside.

Referring to FIG. 10, the second casing 120 has: a second rotational disk 121, a second connecting portion 122, a second hole 123, an engaging groove 124, a convex portion 125, and a second casing inclined surface 126. Among them, the second rotational disk 121 is a disk-shaped portion for being joined to the first casing 110, and may have approximately the same diameter as the first rotational disk 111. The first rotational disk 111 and the second rotational disk 121 are stacked along a transversely extending rotating axis, and can rotate in respect to each other. The first rotational disk 111 and the second rotational disk 121 can be engaged with each other to form a disk-shaped accommodation space for accommodating the driving member 150, the engaging member 140 and the first elastic member 191.

The convex portion 125 is disposed on the outer periphery of the second rotational disk 121. When the second rotational disk 121 rotates from a first angular position (unfolded position) to a second angular position (folded position) in respect to the first rotational disk 111, the convex portion 125 can act on the locking member 170 to drive the locking member 170 from a locked position to a released position, which will be described in detail later.

In this embodiment, an angle difference between the first angular position and the second angular position is between 120 degrees and 180 degrees.

The second connecting portion 122 extends obliquely upward from the outer periphery of the second rotational disk 121 for being joined to the upper supporting tube 300, and the second connecting portion 122 may be arranged corresponding to the upper supporting tube 300, for example, the second connecting portion 122 may be arranged as a sleeve or an insert. The second hole 123 is formed in a center of the second rotational disk 121 for the transversal rotating shaft to be inserted therein. In an embodiment of the application, the rotating shaft is directly integrated on the second casing 120, and in other embodiments, the rotating shaft may be an independent component. The engaging groove 124 is formed on an inner surface of the second rotational disk 121, and extends from the inner surface toward the first rotational disk 111 (i.e., in the transverse direction of the child stroller). The engaging groove 124 has a shape corresponding to that of the engaging member 140 and is used for accommodating the engaging member 140. The second casing inclined surface 126 is arranged on an inner side of the second casing 120, and is corresponding to a drive inclined surface 151 of the driving member 150. More specifically, the second casing inclined surface 126 may be a spiral inclined surface extending along a circumferential direction of the second casing 120 and gradually rising toward the driving member 150.

The socket 130 extends downward from the outer periphery of the first casing 110. In this embodiment, the socket 130 and the first casing 110 are integrated into one component, and in other embodiments, the socket 130 and the first casing 110 may be independent components mounted together. The socket 130 is shaped substantially rectangular, and corresponding to the shape of the socket groove 181 of the fixed bases 180 (see FIG. 2). The socket 130 is provided with an opening 131 on a side facing the fixed base 180, and the locking member 170 can extend out of the socket 130 through the opening 131, so as to be inserted into the fixed base 180.

Figure 12A:
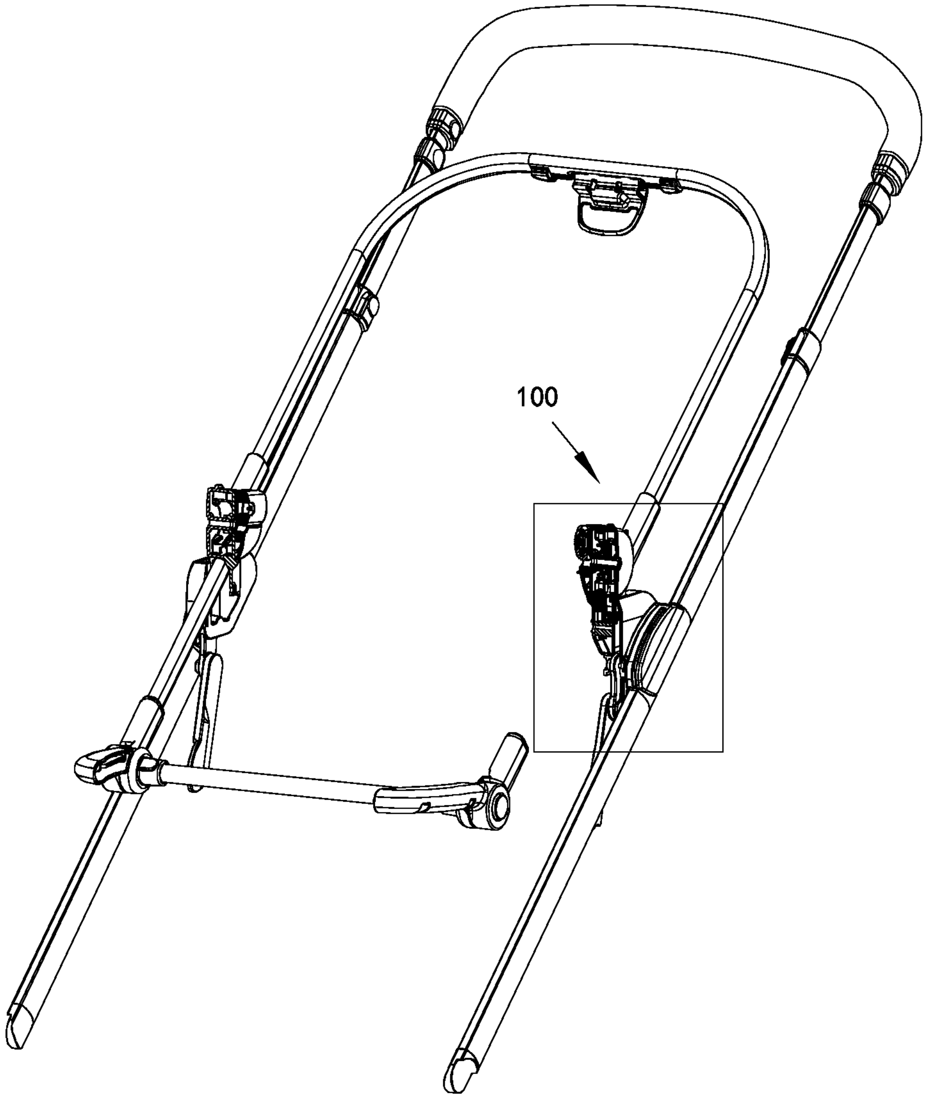
FIG. 12A is a perspective view of the seat, in which the upper supporting tube is in an unfolded state, the locking member is in a locked position, and the locking mechanism is vertically cut along a pivoting shaft of the upper supporting tube.
Figure 12B:
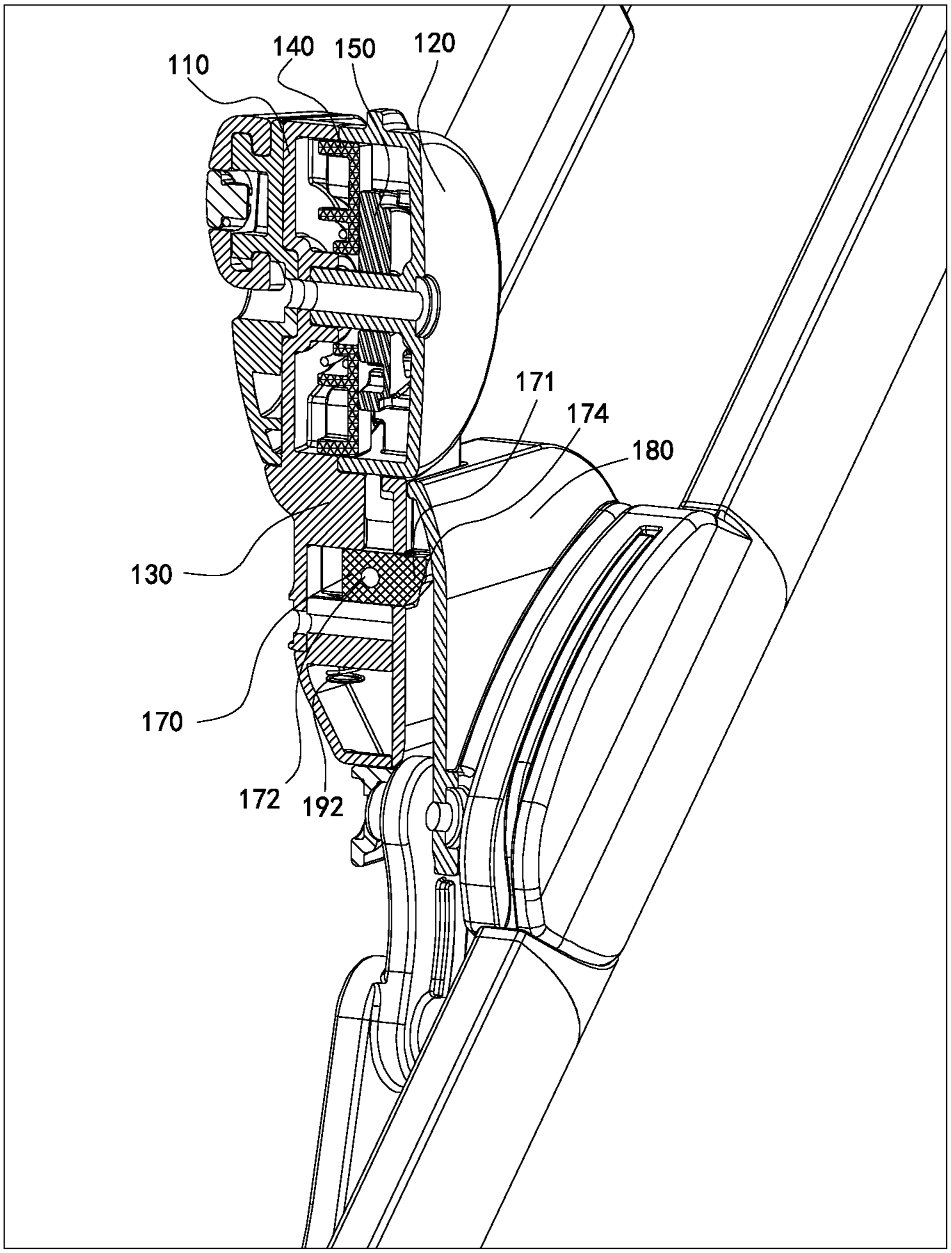
FIG. 12B is a partially enlarged view of the block part in FIG. 12A.
Figure 12C:
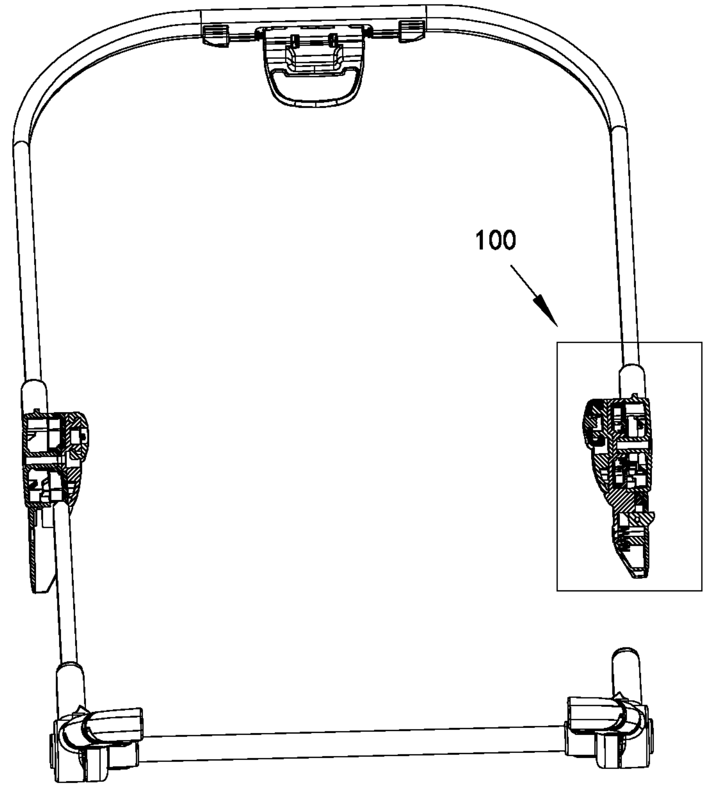
FIG. 12C is a front view of the seat, in which the upper supporting tube is in an unfolded state, the locking member is in a released position, and the locking mechanism is vertically cut along the pivoting shaft of the upper supporting tube.
Figure 12D:
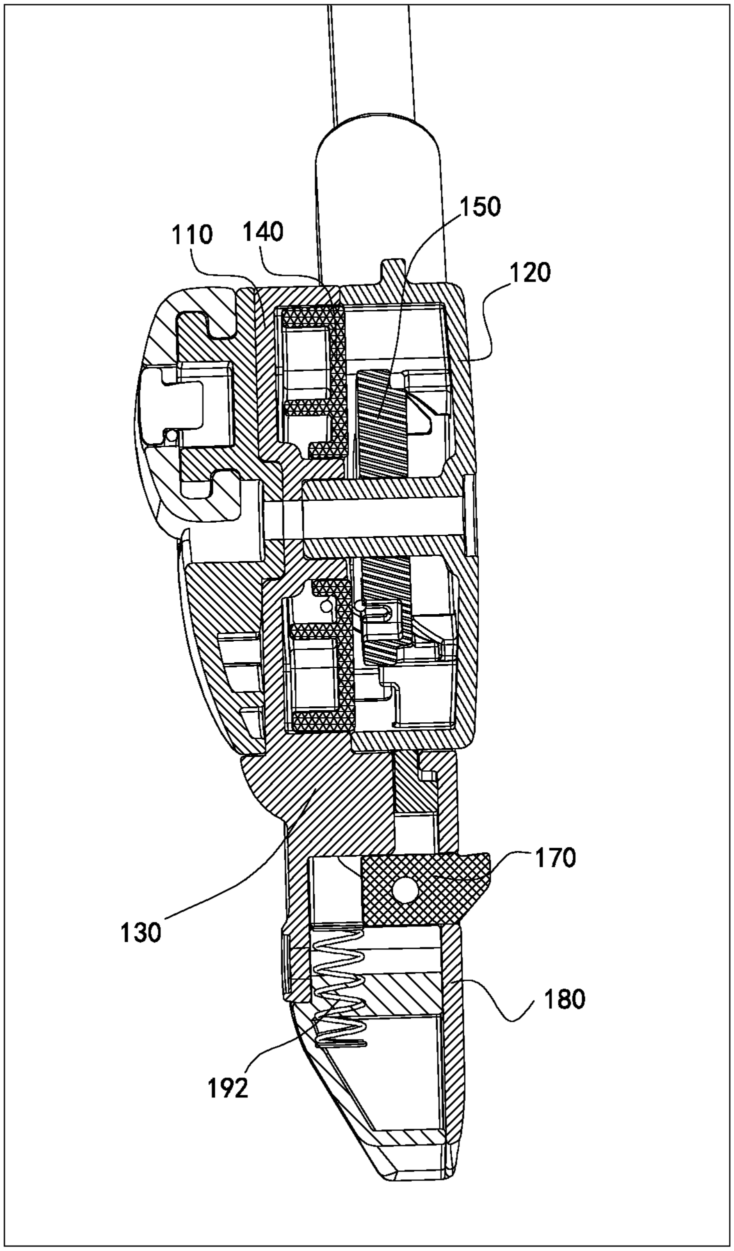
FIG. 12D is a partially enlarged view of the block part in FIG. 12C.
Figure 13A:
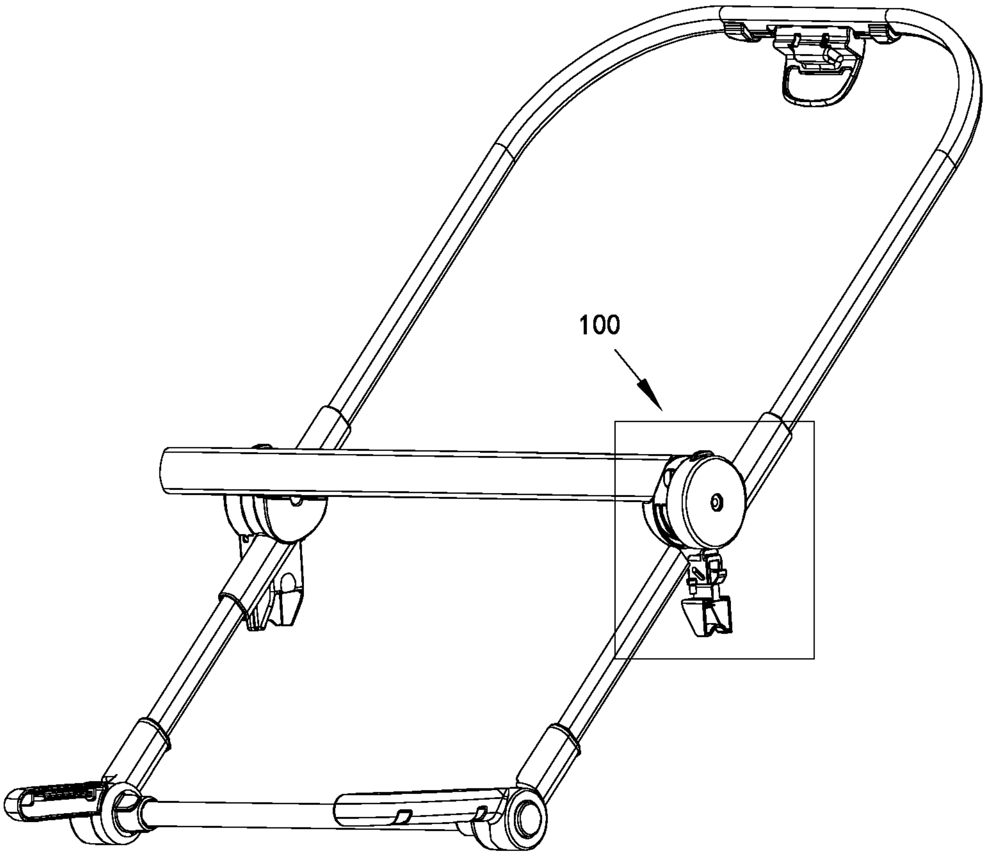
FIG. 13A is a perspective view of the seat, in which the upper supporting tube is in an unfolded state, and an outer surface of the socket is removed to show the slider and the locking member.
Figure 13B:
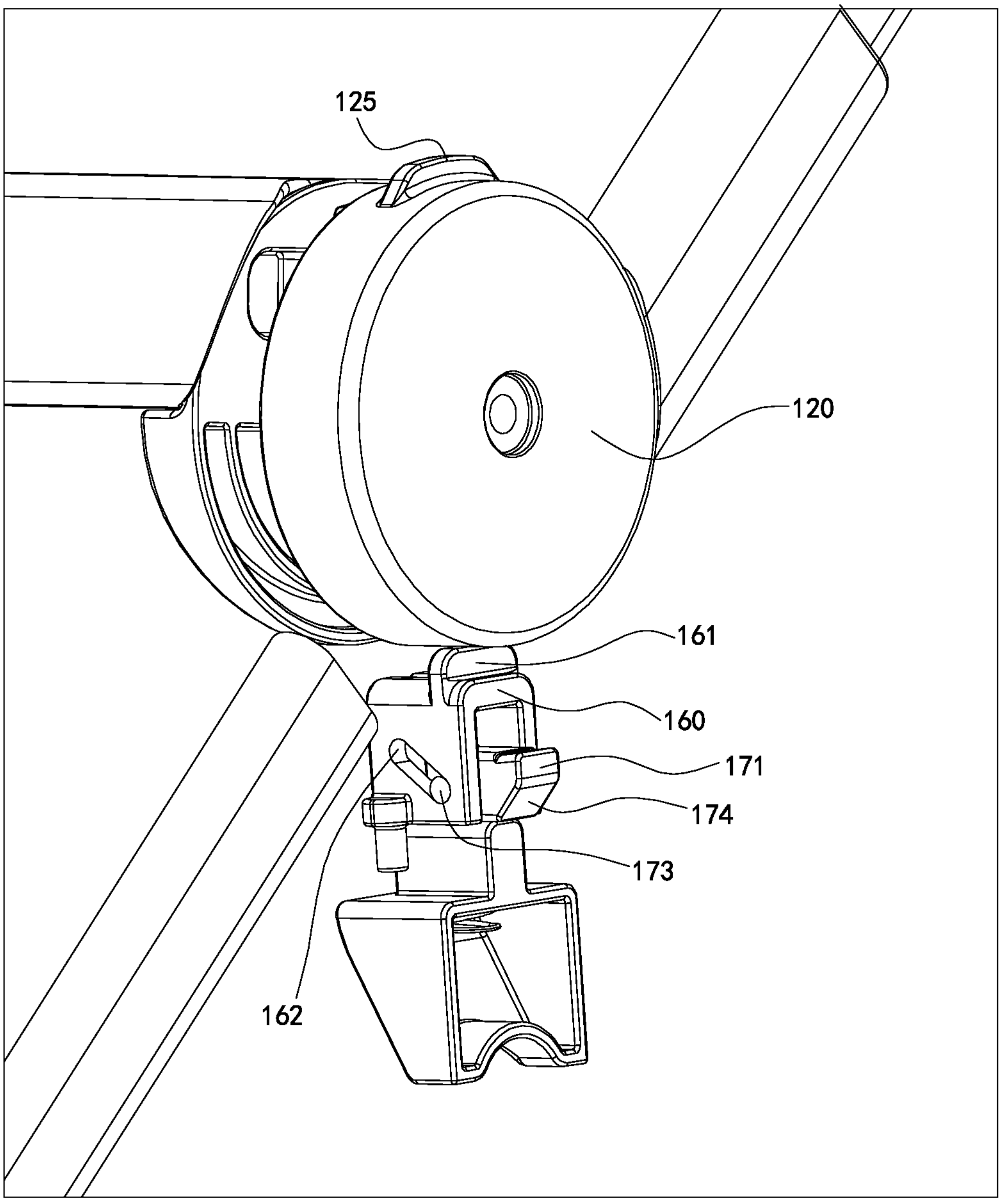
FIG. 13B is a partially enlarged view of the block part in FIG. 13A.

Referring to FIGS. 12B and 13B, the locking member 170 is at least partially accommodated in the socket 130, and can protrude from the opening 131 (FIG. 8B) of the socket 130. The locking member 170 can move between the locked position where the locking member 170 is engaged with the fixed base 180 and the released position where the locking member 170 is retracted into the socket 130 and disengaged from the third object. More specifically, the locking member 170 includes a locking tab 171, a pin hole 172, a pin 173, and a locking member inclined surface 174. Among them, the locking tab 171 is a part protruding from the socket 130. The locking member inclined surface 174 is disposed on an outer surface of the locking tab 171 in the direction of inserting into the fixed base 180 along the socket 130, such that during the process that the locking mechanism 100 is inserted into the fixed base 180, the fixed base 180 can temporarily retract the locking member 170 into the socket 130 by the locking member inclined surface 174. The pin hole 172 is a through hole transversely formed along the locking member 170, and the pin 173 is transversely inserted into the pin hole 172.

Figure 11A:
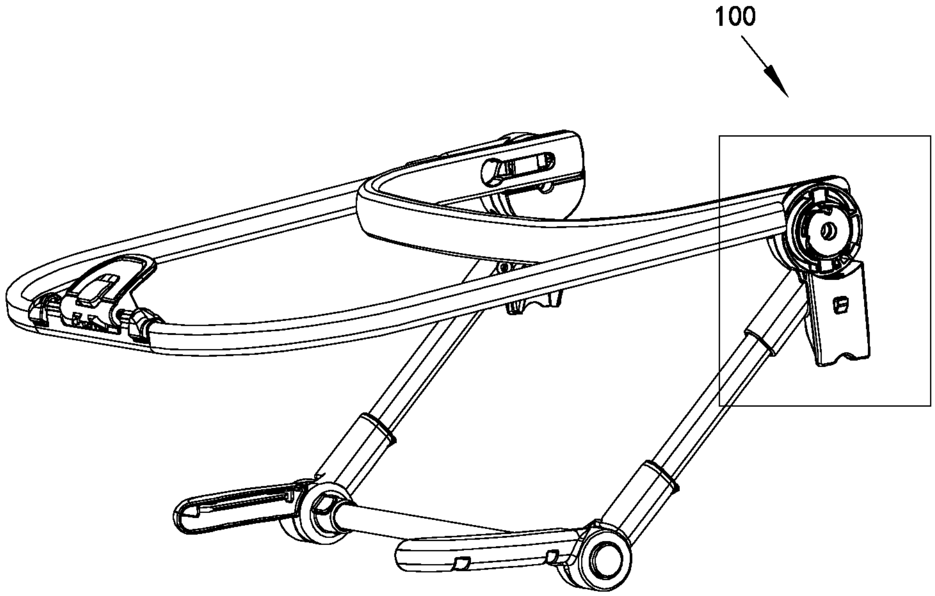
FIG. 11A is a perspective view of the seat, in which the upper supporting tube is in a partially folded state, and the outer casing of the locking mechanism is removed to show internal structure.
Figure 11B:
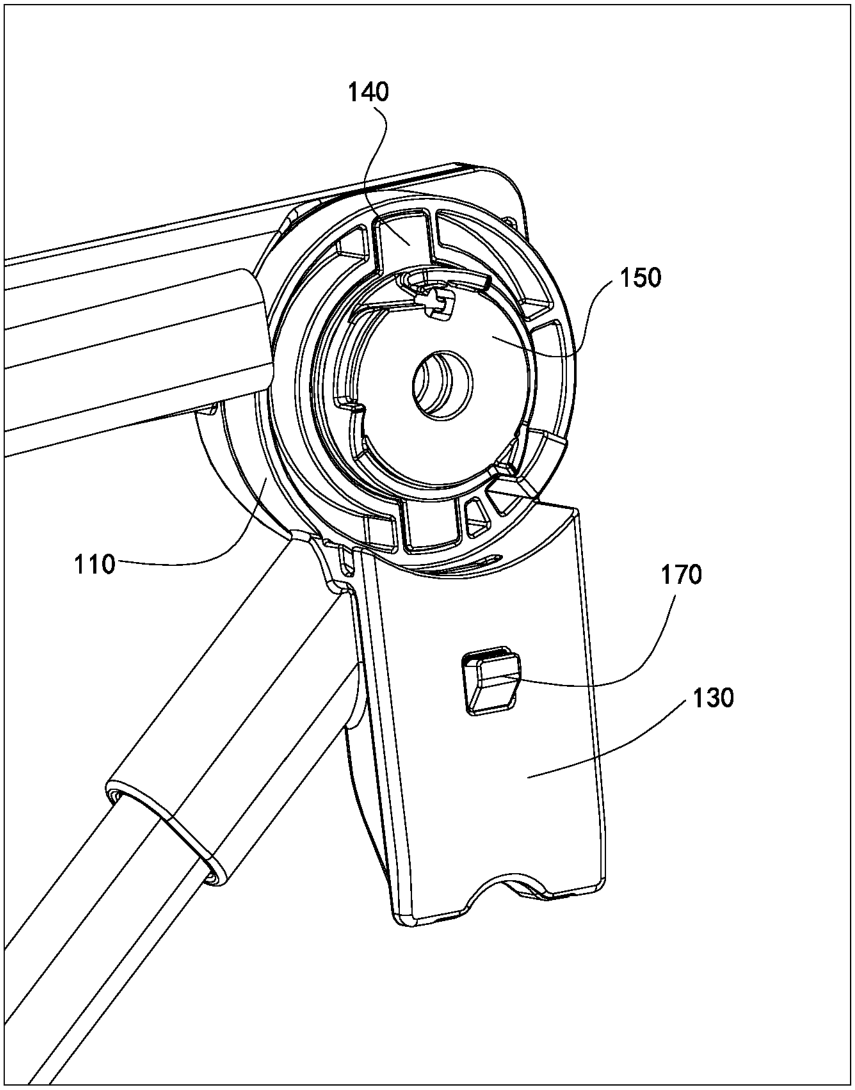
FIG. 11B is a partially enlarged view of the block part in FIG. 11A.

Referring to FIG. 13B, the slider 160 is slidably disposed on or in the socket 130 (see FIG. 11B). The slider 160 has a cam contact portion 161 and slots 162. Among them, the cam contact portion 161 is disposed at an end close to the second casing 120, and the slots 162 are disposed at same positions on both side walls of the slider 160. The slider 160 can slide between a proximal position close to the second casing 120 and a distal position away from the second casing 120. In this embodiment, the slider 160 is arranged to be slidable substantially longitudinally, and in other embodiments, the slider 160 can also slide in an inclined direction. A second elastic member 192 (see FIGS. 12B, 12D) is disposed between the slider 160 and the socket 130, and biases the slider 160 toward the proximal position.

The convex portion 125 of the second rotational disks 121 is able to contact the slider 160, such that when the second rotational disks 121 (and the upper supporting tube 300) rotates from the first angular position to the second angular position, the convex portion 125 abuts against the slider 160, driving the slider 160 from the proximal position to the distal position.

The slider 160 is joined to the locking member 170, and drives the locking member 170 from the locked position to the released position when moving from the proximal position to the distal position. More specifically, the slider 160 has two side walls and an accommodation space formed between the two side walls, and the two side walls are respectively provided with the same slots 162 extending obliquely in respect to both the vertical and horizontal directions. The locking member 170 is inserted into the accommodation space, and the pin 173 protruding respectively from both sides of the locking member 170 is slidably inserted into the slots 162 on the two side walls, such that a vertical motion of the slider 160 from the proximal position to the distal position can be converted into a transversal motion of the locking member 170 from the locked position to the released position.

In other embodiments, the convex portion 125 of the second casing 120 may also directly act on the locking member 170. For example, the locking member 170 may be provided with an inclined abutment surface that extends obliquely toward the second casing 120 and in respect to both transversal and longitudinal directions. Such inclined abutment surface is relatively far away from the second casing 120 on a locked position side of the locking member 170 and is relatively close to the second casing 120 on a released position side of the locking member 170. In this way, when the second casing 120 is rotated from the first angular position to the second angular position, the convex portion 125 abuts against the inclined abutment surface, such that the locking member 170 moves from the locked position to the released position. In such an embodiment, the slider 160 may be omitted, and the second elastic member 192 may be arranged to bias the locking member 170 toward its locked position.

The engaging member 140 is inserted into the first casing 110 in a matched shape, and can move transversely to be partially inserted into the second casing 120. More specifically, the engaging member 140 has an annular portion 141 and two engaging portions 142 (see FIG. 8B). The annular portion 141 is approximately perpendicular to the rotating shaft of the first casing 110 and the second casing 120, and is sleeved on the rotating shaft. The engaging portion 142 extends radially outward from the periphery of the annular portion 141, and the shape of the engaging portion 142 corresponds to the accommodation groove 114 in the first casing 110 and the engaging groove 124 in the second casing 120. When the engaging member 140 is partially inserted into the second casing 120, the engaging member 140 locks the second casing 120 and the first casing 110 to prevent them from rotating in respect to each other. At this time, the second rotational disk 121 is in the first angular position.

The first elastic member 191 is disposed between the engaging member 140 and the first casing 110, and biases the engaging member 140 to be inserted into the second casing 120.

The driving member 150 is accommodated in the second casing 120, and abuts against or is connected to the engaging member 140. The driving member 150 is arranged in a substantially disk shape and rotates along the same rotating axis as the first casing 110 and the second casing 120. The driving member 150 includes a driving member inclined surface 151 and a drag second end connecting portion 152 (see FIG. 8B). The driving member inclined surface 151 is provided by at least two, and the at least two driving member inclined surfaces 151 are uniformly distributed along a circumferential direction on a periphery of the driving member 150 and facing the second casing 120. The shape of each of the driving member inclined surfaces 151 correspond to the shape of the second casing inclined surface 126. More specifically, each of the driving member inclined surfaces 151 may be an inclined surface extending along the circumferential direction of the driving member 150 and gradually rising toward the second casing 120. The drag second end connecting portion 152 is disposed at a position outside the center of the disk portion of the driving member 150, and is arranged as a convex portion, a groove or any suitable form, as long as the drag member 510 can be fixed to the driving member 150.

The driving member 150 can be driven to rotate around the rotating shaft according to the user's operation, and its rotation will bring the engaging member 140 to move transversely, such that the engaging member 140 can be partially moved out of the first casing 110 and inserted into the second casing 120, or separated from the second casing 120 and moved into the first casing 110. More specifically, when the driving member 150 is dragged by the drag member 510 to rotate, the driving member inclined surface 151 and the second casing inclined surface 126 will abut against each other, thereby converting the rotational force into a traversal moving force, such that the driving member 150 moves toward the first casing 110. In this embodiment, the driving member 150 is disposed between the engaging member 140 and the second casing 120, and abuts against the engaging member 140, thus brining the engaging member 140 to move to the first casing 110, thereby releasing rotation of the second casing 120. In other embodiments, the driving member 150 may also be disposed between the engaging member 140 and the first casing 110 and rotatably joined to the engaging member 140, which can also bring the engaging member 140 to move to the first casing 110.

In other embodiments, the driving member 150 may be driven in other ways. For example, a part of the driving member 150 (referred to as a pulling portion) may be exposed to the outside through a slot on a side wall of the first casing 110 or the second casing 120. The user can directly rotate the driving member 150 by the pulling portion. In such an embodiment, both the drag member 510 and the operating device 500 are unnecessary.

In other embodiments, other locking forms may be used between the first casing 110 and the second casing 120. For example, the outer periphery of the first casing 110 may be provided with a latch, and the outer periphery of the second casing 120 may be provided with a slot. The user can directly operate the latch to lock and unlock rotation of the second casing 120. In such an embodiment, the engaging member 140, the driving member 150, the drag member 510, and the operating device 500 are unnecessary.

The operation of the locking mechanism 100 according to the application will be described with reference to FIGS. 12A to 15B.

In the state shown in FIGS. 12A to 12B, the seat is in the unfolded position, the engaging member 140 is inserted into the first casing 110 and the second casing 120 at the same time, and the locking member 170 is inserted into the fixed base 180. Therefore, the second casing 120 (and the upper supporting tube 300) cannot rotate, and the seat cannot be taken off from the frame 400.

When the user wants to take off the seat, he must fold the seat firstly. Specifically, the user drags the drag member 510 by the operating device 500, and the drag member 510 brings the driving member 150 to rotate, such that the driving member 150 moves toward the first casing 110 (left side in FIG. 12B). The driving member 150 then brings the engaging member 140 to move into the first casing 110 and be separated from the second casing 120. At this time, the locking mechanism 100 becomes the state shown in FIGS. 12C to 12D.

Since the engaging member 140 is separated from the second casing 120, now the second casing 120 can be rotated in respect to the first casing 110. Therefore, the user may rotate the second casing 120 toward the folded position, and the rotation process is shown in FIGS. 13A to 15B. With rotation of the second casing 120, the convex portion 125 abuts against the slider 160 and drives the slider 160 to the distal position (downward in the figure). As the slider 160 moves toward the distal position, since the locking member 170 is limited to move transversely, the pin 173 of the locking member 170 moves leftward along the slots 162 of the slider 160, such that the locking member 170 moves from the locked position shown in FIGS. 13A-13B to the released position shown in FIGS. 15A-15B. At this time, the seat is unlocked from the frame 400, allowing the user to take off the seat from the frame 400.

When the user wants to mount the seat on the frame 400, it is only required to reverse the above steps.

In conclusion, the application proposes a locking mechanism that allows two relatively rotating components to be detachably locked to another component. Moreover, the locking of another component can only be released when the two components rotate to a specific angle in respect to each other. The current situation is that the caregiver may not take the child from before reversing direction of the seat and installing the seat, but directly separate the seat from the frame together with the child, which is very dangerous. In the child stroller of the application, the locking mechanism of the application is used to connect the seat and the frame, forcing the user to fold the seat before taking the seat off the frame. That is, if the caregiver wants to reverse direction of the seat, he must first take the child away, and then fold the seat before taking off the seat. In this way, the operation of the caregiver can be regulated compulsorily, and the safety performance of the child stroller can be increased, thus avoiding the dangerous operation of taking the child together with the seat from the frame.

Since this application can be embodied in various forms without departing from the spirit and essence of the application, it should be understood, the above-mentioned embodiments are not limited to any of the foregoing details, but should be interpreted in the broadest sense within the scope defined by the claims. Therefore, all changes that fall within the scope of the claims or their equivalents should be covered by the claims.

LIST OF REFERENCE SIGNS

100: Locking Mechanism
- 110: First Casing (Inner Casing)
  - 111: First Rotational Disk
  - 112: First Connecting Portion
  - 113: First Hole
  - 114: Accommodation groove
- 120: Second Casing (Outer Casing)
  - 121: Second Rotational Disk
  - 122: Second Connecting Portion
  - 123: Second Hole
  - 124: Engaging groove
  - 125: Convex Portion
  - 126: Second Casing Inclined Surface
- 130: Socket
  - 131: Opening
- 140: Engaging member
  - 141: Annular Portion
  - 142: Engaging portion
- 150: Driving Member
  - 151: Drive Inclined Surface
  - 152: Drag Second End Connecting Portion
- 160: Slider
  - 161: Cam Contact Portion
  - 162: Slot
- 170: Locking Member
  - 171: Locking Tab
  - 172: Pin Hole
  - 173: Pin
  - 174: Locking Member Inclined Surface
- 180: Fixed Base
  - 181: Socket groove
- 191: First Elastic Member (Locking member Elastic Member)
- 192: Second Elastic Member (Slider Elastic Member)

200: Lower Supporting Tube (First Object)
300: Upper Supporting Tube (Second Object)
400: Frame (Third Object)
500: Operating Device
- 520: Operating Member
- 530: Slidable Connecting Member
- 540: Mount Base
- 550: Driving Rib
- 560: Driving Slope
- 570: Driving Groove Portion

510: Drag Member
- 511: Drag First End
- 512 Drag Second End

X: Transversal Axis

What is claimed is:

1. A stroller locking mechanism, wherein the stroller locking mechanism is for connecting a first object and a second object which are rotatable relative to each other and relative to a third object; wherein the stroller locking mechanism is connected to the first object and the second object, and is releasably connected to the third object; wherein a rotation of the second object relative to the first object allows the stroller locking mechanism to be released from the third object, the stroller locking mechanism comprising:

a first casing fixed to the first object and having a first rotational disk;

a second casing fixed to the second object and having a second rotational disk, wherein the first rotational disk and the second rotational disk are stacked along a transversely extending rotating axis and rotatable relative to each other; and a locking member capable of moving between a locked position where the locking member is engaged with the third object and a released position where the locking member is disengaged from the third object;

a convex portion disposed on an outer periphery of the second rotational disk, and wherein when the second rotational disk rotates from a first angular position to a second angular position in relation to the first rotational disk, the convex portion is capable of acting on the locking member to drive the locking member from the locked position to the released position.

2. The locking mechanism according to claim 1, wherein the locking mechanism further comprises:

a fixed base fixed to the third object; and a socket fixed to the first casing, extending outward from an outer periphery of the first rotational disk and being releasably inserted into the fixed base;

wherein the locking member at least partially accommodated in the socket, capable of moving between the locked position where the locking member is protruding from the socket and the released position where the locking member is retracted into the socket.

3. The locking mechanism according to claim 2, wherein the locking mechanism further comprises:

a slider slidably disposed on the socket and capable of sliding between a proximal position close to the second casing and a distal position away from the second casing;

wherein, when the second rotational disk rotates from the first angular position to the second angular position, the convex portion abuts against the slider and drives the slider from the proximal position to the distal position; and wherein the slider is joined to the locking member, and drives the locking member from the locked position to the released position when moving from the proximal position to the distal position.

4. The locking mechanism according to claim 3, wherein the slider is provided with a slot extending obliquely with respect to both vertical and horizontal directions, a pin protruding from one side of the locking member is slidably inserted into the slot, such that a vertical movement of the slider from the proximal position to the distal position is converted into a transversal movement of the locking member from the locked position to the released position.

5. The locking mechanism according to claim 4, wherein the locking mechanism further comprises:

an engaging member and a driving member, stacked in an accommodation space formed between the first casing and the second casing along the rotating axis, the engaging member is inserted into the first casing, and the driving member is accommodated in the second casing and abuts against or is connected to the engaging member;

wherein the driving member is driven to rotate about the rotating axis, and rotation of the driving member brings the engaging member to move transversely, such that the engaging member allows or restricts the rotation of the second casing.

6. The locking mechanism according to claim 5, wherein:

the driving member is provided with at least two driving member inclined surfaces facing the second casing, and a corresponding second casing inclined surface facing the at least two driving member inclined surfaces is formed on an inner side of the second casing, and when the driving member is driven to rotate, the driving member inclined surfaces interact with the second casing inclined surface to convert a rotational motion of the driving member in respect to the second casing into a lateral movement of the engaging member towards the first casing, such that the engaging member allows the second casing to rotate relative to the first casing.

7. The locking mechanism according to claim 6, wherein: the engaging member is disk-shaped, and has two engaging portions projecting outwardly at two radial ends distributed along its circumferential direction, and an inner side of the second casing is provided with an engaging groove having a shape corresponding to that of the engaging member; and the locking mechanism further comprises a first elastic member, and the first elastic member is disposed between the first casing and the engaging member to bias the engaging member into the second casing.

8. The locking mechanism according to claim 7, wherein:

the locking mechanism further comprises a second elastic member, and the second elastic member is disposed between the slider and the socket to bias the slider toward the proximal position; and the locking member has a locking tab capable of protruding from the socket and inserting into the third object, and a locking member inclined surface is disposed on an outer surface of the locking tab in a direction of inserting into the fixed base along the socket, such that during a process that the locking mechanism is inserted into the fixed base, the fixed base is capable of temporarily retracting the locking member into the socket by the locking member inclined surface.

9. The locking mechanism according to claim 8, wherein the locking mechanism further comprises a drag member, wherein the drag member has a drag second end connected to the driving member and a drag first end extending out of the locking mechanism, wherein, when the drag first end is dragged, the drag member is capable of brining the driving member to rotate.

10. The locking mechanism according to claim 9, wherein:

the locking mechanism further comprises an operating device, wherein the operating device is mounted on the second object and includes:

a slidable connecting member slidably mounted on the second object along a transversal direction; and an operating member slidably or rotatably mounted on the second object and operatively coupled with the slidable connecting member;

wherein the drag first end of the drag member is connected to a pair of the slidable connecting members, and an operation of the operating member is capable of brining the slidable connecting members to slide toward each other, thereby dragging the drag member.

11. The locking mechanism according to claim 10, wherein at least one driving rib with a driving slope is arranged on the operating member, and each one of the slidable connecting members is provided with a driving groove portion engaged with the at least one driving rib, wherein the at least one driving rib acts on the driving groove portion by the driving slope to bring the slidable connecting members to slide.

12. The locking mechanism according to claim 11, wherein:

an angle difference between the first angular position and the second angular position is between 120 degrees and 180 degrees; and the driving member inclined surface and the second casing inclined surface are arc inclined surfaces capable of being engaged with each other.

13. A child stroller, wherein the child stroller comprises: a frame; at least one wheel, mounted under the frame; and a seat detachably mounted on the frame by the stroller locking mechanism according to claim 1, wherein the first object is a lower supporting tube of the seat, the second object is an upper supporting tube of the seat, and the third object is the frame; wherein the lower supporting tube and the upper supporting tube are respectively U-shaped, and both ends of two legs of the U-shaped lower supporting tube and both ends of two legs of the U-shaped upper supporting tube are correspondingly connected to each other by the stroller locking mechanism.

14. The locking mechanism according to claim 4, wherein the slider has two side walls and an accommodating space formed between the two side walls, at least one of the side walls, and the locking member is inserted into the accommodation space.

15. The locking mechanism according to claim 5, wherein the engaging member moves transversely such that the engaging member partially moves out of the first casing and is inserted into the second casing, or is separated from the second casing and moved into the first casing, wherein, when the engaging member is inserted into the second casing, the engaging member locks the second casing and the first casing to prevent them from rotating in respect to each other, meanwhile the second rotational disk is in the first angular position, and wherein, when the engaging member is separated from the second casing, the second casing is rotatable in respect to the first casing.

16. The locking mechanism according to claim 6, wherein at least two driving members are uniformly distributed on a periphery of the driving member along a circumferential direction.

* * * * *